US007700248B2

(12) United States Patent
Jin et al.

(10) Patent No.: US 7,700,248 B2
(45) Date of Patent: Apr. 20, 2010

(54) ORGANIC CHARGE TRANSPORTING POLYMERS INCLUDING CHARGE TRANSPORT MOIETIES AND SILANE GROUPS, AND SILSESQUIOXANE COMPOSITIONS PREPARED THEREFROM

(75) Inventors: Xin Jin, Pittsford, NY (US); Wayne T. Ferrar, Fairport, NY (US); David S. Weiss, Rochester, NY (US); Louis J. Sorriero, Rochester, NY (US)

(73) Assignee: Eastman Kodak Company, Rochester, NJ (US)

( * ) Notice: Subject to any disclaimer, the term of this patent is extended or adjusted under 35 U.S.C. 154(b) by 784 days.

(21) Appl. No.: 10/615,089

(22) Filed: Jul. 8, 2003

(65) Prior Publication Data

US 2004/0126683 A1 Jul. 1, 2004

Related U.S. Application Data

(60) Provisional application No. 60/394,377, filed on Jul. 8, 2002.

(51) Int. Cl.
*G03G 5/047* (2006.01)

(52) U.S. Cl. .................. 430/58.2; 430/58.7; 430/66

(58) Field of Classification Search ............. 430/58.2, 430/58.7, 66, 72, 73, 75, 76, 78, 80, 96; 525/342, 525/326.5, 100
See application file for complete search history.

(56) References Cited

U.S. PATENT DOCUMENTS

| | | | |
|---|---|---|---|
| 3,542,544 A | 11/1970 | Seus et al. | |
| 3,923,485 A * | 12/1975 | Franz | 65/24 |
| 4,082,710 A * | 4/1978 | Vrancken et al. | 524/714 |
| 4,407,920 A | 10/1983 | Lee et al. | 430/66 |
| 4,439,509 A | 3/1984 | Schank | 430/67 |
| 4,595,602 A | 6/1986 | Schank | 430/67 |
| 4,606,934 A | 8/1986 | Lee et al. | 430/67 |
| 4,647,521 A * | 3/1987 | Oguchi et al. | 430/58.05 |
| 4,912,000 A | 3/1990 | Kumakura et al. | 430/67 |
| 4,917,980 A | 4/1990 | Badesha et al. | 430/66 |
| 5,116,703 A | 5/1992 | Badesha et al. | 430/96 |
| 5,204,201 A | 4/1993 | Schank et al. | 430/66 |
| 5,368,967 A | 11/1994 | Schank et al. | 430/66 |
| 5,427,880 A * | 6/1995 | Tamura et al. | 430/58.7 |
| 5,688,961 A | 11/1997 | Kushibiki et al. | 430/76 |
| 5,693,442 A | 12/1997 | Weiss et al. | 430/66 |
| 5,712,360 A | 1/1998 | Kobayashi et al. | 528/38 |
| 5,731,117 A | 3/1998 | Ferrar et al. | 430/66 |
| 5,747,204 A | 5/1998 | Anzai et al. | 430/3 |
| 5,824,443 A | 10/1998 | Kushibiki et al. | 430/73 |
| 5,840,816 A | 11/1998 | Kobayashi et al. | 528/4 |
| 5,874,018 A | 2/1999 | Ferrar et al. | 252/622 |
| 5,888,690 A | 3/1999 | Yoshinaga et al. | 430/132 |
| 5,905,008 A | 5/1999 | Yoshinaga et al. | 430/66 |
| 5,910,272 A | 6/1999 | Kushibiki et al. | 252/500 |
| 5,939,090 A * | 8/1999 | Beaurline et al. | 424/434 |
| 6,030,736 A | 2/2000 | Ikegami et al. | 430/59.6 |
| 6,046,348 A | 4/2000 | Yamada et al. | 556/413 |
| 6,066,425 A | 5/2000 | Ferrar et al. | 430/58.1 |
| 6,143,452 A | 11/2000 | Sakimura et al. | 430/58.2 |
| 6,187,491 B1 | 2/2001 | Ferrar et al. | 430/58.2 |
| 6,203,692 B1 | 3/2001 | Sarangapani et al. | 205/763 |
| 6,265,122 B1 | 7/2001 | Itami et al. | 430/58.2 |
| 6,376,695 B1 | 4/2002 | Kushibiki et al. | 556/413 |
| 6,495,300 B1 | 12/2002 | Qi et al. | 430/66 |
| 6,517,984 B1 | 2/2003 | Ferrar et al. | 430/58.2 |
| 6,596,450 B2 | 7/2003 | Hu et al. | 430/58.7 |
| 2001/0017155 A1 | 8/2001 | Bellmann et al. | 136/263 |

OTHER PUBLICATIONS

Diamond, A.S., ed., *Handbook of Imaging Materials*, Marcel Dekker, Inc., NY (1991), pp. 428-431.*

Grant, R., et al., Grant & Hachk's Chemical Dictionary, fifth edition, McGraw-Hill Book Company, NY (1987), p. 145.*

C. Sanchez, et al.; "Molecular Design of Hybrid Organic-Inorganic Nanocomposites Synthesized via Sol-Gel Chemistry"; J. Mater. Chem.; 1999; vol. 9; pp. 35-44.

Nicolas Gatica, et al.; "Vinyltrimethoxysilane-Co-2-Vinylpyridine Copolymer"; Polymer Bulletin 43; 1999; pp. 171-172.

Ralph K. Iler, "The Chemistry of Silica," pp. 331, 337, A Wiley-Interscience Publication, John Wiley & Sons, New York, 1979.

(Continued)

*Primary Examiner*—Janis L Dote
(74) *Attorney, Agent, or Firm*—Carl R. Ruoff; Andrew J. Anderson

(57) ABSTRACT

Disclosed are polymers which include tertiary aryl amine moieties that can function as hole transport agents and which also have reactive silane groups thereon capable of being condensed to a silsesquioxane composition, as well as the silsesquioxane compositions prepared therefrom. The silsesquioxanes can be coated onto substrates to form abrasion-resistant layers having hole transport properties useful in devices that require charge transport properties, such as light-emitting diodes and organic electrophotographic elements such as photoreceptors or photoconductors. Also disclosed are electrophotographic elements which comprise an electrically conducting layer, a charge generating layer overlying the electrically conducting layer, and a charge transport layer overlying the electrically conducting layer. The charge transport layer, which can be an overcoat overlying the charge generating layer, comprises the condensed reaction product of the disclosed polymers.

62 Claims, No Drawings

OTHER PUBLICATIONS

Bellmann et al., Chem Mater., 2000, vol. 12, p. 1349-1353.
Bellmann et al., Chem. Mater., 1999 vol. 11, p. 399-407.
Ferrar et al., Polymer Preprints, 2000, vol. 41(1), p. 503-504.
Feast et al., Polymer Bulletin 1999 vol. 42, p. 167-174.
Schneider et al., Chem. Mater., 2000, vol. 12, p. 352-362.
Sanchez et al., New J. Chem., 1994, vol. 18, p. 1007-1047.
Ribot et al., Comments on Inorganic Chemistry, 1999, vol. 20, p. 327-361.
Suratwala et al., Chem Mater., 1998, vol. 10, p. 199-209.
Rao et al., Eur. Polym. J. 1989, vol. 25, pp. 605-609.
Wei et al., J. Mater. Res. 1993, vol. 8, pp. 1143-1152.

* cited by examiner

ORGANIC CHARGE TRANSPORTING POLYMERS INCLUDING CHARGE TRANSPORT MOIETIES AND SILANE GROUPS, AND SILSESQUIOXANE COMPOSITIONS PREPARED THEREFROM

REFERENCE TO PRIOR APPLICATION

This application claims the benefit of U.S. Provisional Application No. 60/394,377, filed Jul. 8, 2002.

FIELD OF THE INVENTION

The present invention relates to polymers produced from vinyl monomers comprising reactive silane groups and aryl amine groups and to silsesquioxanes prepared from the polymers. The invention also relates to apparatus having charge transport layers comprising such polymers and/or silsesquioxanes, and in particular, devices such as electrophotographic photoreceptors and organic light-emitting diodes.

BACKGROUND OF THE INVENTION

Organic polymers are used for charge transport in devices such as organic light-emitting diodes (OLED) and organic electrophotographic photoreceptors or photoconductors (OPC). In OLEDs charge is injected from an electrode into a charge transporting layer, in an OPC the charge is photogenerated and subsequently injected into the charge transport material dissolved in, or a functional part of, an organic polymeric material which serves as the binder. In these devices, the aim is for charge to be transported, in the absence of trapping, from the site of injection to the counter electrode, driven by the applied field.

In charge generating elements, incident light induces a charge separation across various layers of a multiple layer device. In an electrophotographic charge generating element, also referred to herein as an electrophotographic element, an electron-hole pair produced within a charge generating layer separate and move in opposite directions to develop a charge between an electrically conductive layer and an opposite surface of the element. The charge forms a pattern of electrostatic potential, also referred to as an electrostatic latent image. The electrostatic latent image can be formed by a variety of means, for example, by imagewise radiation-induced discharge of a uniform potential previously formed on the surface. Typically, in the electrophotographic process the electrostatic latent image is developed by contacting it with an electrographic developer to form a toner image, which is then fused to a receiver. If desired, the latent image can be transferred to another surface before development, or the toner image can be transferred before fusing.

In an electrophotographic process, the photoreceptor is typically subjected to a variety of physical and chemical abuses, such as scratching, abrasive wear and exposure to chemicals, e.g., ozone and nitrogen oxides, from corona charging. Organic photoreceptors are typically easily damaged by these abuses and their useful lifetime thereby can be decreased. The surface of an organic photoreceptor can be relatively soft, so that cleaning, by blade or brush, causes scratches and abrasive wear. Unintended contacts of the surface with sharp objects may also result in scratches that necessitate photoreceptor replacement. The photoreceptor surface is also relatively permeable and its components are reactive towards the ozone and nitrogen oxides generated during corona charging. After extended exposure to such chemicals, the electrophotographic characteristics may degrade to the point where image defects become objectionable and the photoreceptor must be replaced. Organic photoreceptors are also susceptible to photochemical damage from ultraviolet radiation emitted from the corona discharge or from exposure to room light. As a result of these factors, the lifetime of an organic photoreceptor is on the order of one hundred thousand cycles. By contrast, a lifetime of one million cycles is typical of the much harder amorphous selenium and arsenic triselenide photoreceptors. Extensive efforts have been devoted in attempts to stabilize organic photoreceptors from such abuses.

Overcoating the photoreceptor with a tough and chemically impervious overcoat layer is one approach that has been utilized to extend their useful life, such as with the materials disclosed in U.S. Pat. Nos. 5,204,201; 4,912,000; 4,606,934; 4,595,602; 4,439,509; and 4,407,920. If they are used, an overcoat should desirably bind well to the underlying photoreceptor materials, not be too brittle such that it cracks in an electrophotographic process, coated in a relatively very thin layer, and transport charge to prevent unwanted charge build up during electrophotographic process cycling. The resistivity of an overcoat has important consequences in an electrophotographic system. If the overcoat has high resistivity and inadequate capability to transport holes, the time constant for voltage decay will be excessively long relative to the processing time for the electrophotographic element, and the overcoat will retain an undesirably high residual potential after photodischarge of the underlying photoreceptor. The magnitude of the residual potential depends upon the initial potential, the dielectric constants of the various layers, the thickness and the charge transport characteristics of each layer. A solution to high residual potential has been to reduce the thickness of the overcoat layer. Another solution is to provide an overcoat that is conductive. The overcoat should not, however, be too conductive. The electrophotographic element should be sufficiently electrically insulating in the dark that the element neither discharges excessively nor allows an excessive migration of charge along the surface of the element. An excessive discharge ("dark decay") would prevent the formation and development of the latent electrostatic latent image. Excessive migration causes a loss of resolution of the electrostatic image and the subsequent developed image. This loss of resolution is referred to as "lateral image spread." The extent of image degradation will depend on the processing time for the electrophotographic element and the thicknesses and dielectric constants of the layers. It is thus desirable to provide an overcoat that is neither too insulating nor too conductive so as to meet the objectives previously mentioned.

The triboelectric properties of the overcoat should also desirably be matched to the triboelectric characteristics of the electrophotographic toner used to develop the electrostatic latent image. If the triboelectric properties are not matched well enough, the electrophotographic element will triboelectrically charge against the electrophotographic toner. This causes disruption of the charge pattern of the electrostatic latent image and can result in background in the resulting toner image. For example, an overcoat can triboelectrically match a particular negatively charging toner, but not triboelectrically match another toner that charges positively.

Silsesquioxanes generally are a class of silicone polymers that have been used as abrasion resistant coatings, including a coating for organic photoreceptors. Such organic silicone coatings are normally prepared by a sol-gel process. Certain silsesquioxane overcoat layers for organic photoreceptors are disclosed in U.S. Pat. Nos. 5,731,117; 5,693,442; 5,874,018; and 6,066,425. The protection of organic photoconductors using an overcoat of polysiloxane mixtures in a polycarbonate resin is described in U.S. Pat. No. 6,030,736.

Charge transport materials (CTMs) have also been added to polymeric binder layers to transport charge in organic photoreceptors. These layers are in general insulators that carry charge when either holes or electrons are injected into them. U.S. Pat. No. 3,542,544 discloses triphenylmethanes and tetraphenylmethanes substituted with dialkylamines as CTMs that are incorporated into photoconductive elements. Triphenylmethane CTMs containing hydroxyaniline groups are described in U.S. Pat. No. 5,368,967. Electrophotographic photoreceptors in which triarylamine compounds with dihydroxy substituents are covalently bonded into polycarbonate resins are disclosed in U.S. Pat. No. 5,747,204. Arylamines incorporated into silsesquioxanes as acid scavengers for photoreceptors is discussed in U.S. Pat. No. 6,187,491. The incorporation of triarylamines in a functional subunit of a composition that also includes an inorganic glassy network subunit and a flexible organic subunit is discussed in U.S. Pat. No. 5,116,703. Imaging members containing hole transporting polysilylene ceramers are described in U.S. Pat. No. 4,917,980.

The incorporation of tertiary arylamines into silsesquioxane polymers for the purpose of transporting holes has been mentioned in U.S. Pat. Nos. 5,688,961; 5,712,360; 5,824,443; 5,840,816; 5,888,690, 5,905,008; 5,910,272, and 6,376,695. Another synthesis method is described in U.S. Pat. No. 6,046,348. In U.S. Pat. No. 6,517,984 by Ferrar et al., the teachings of which are incorporated herein by reference in their entirety, certain silsesquioxane compositions are disclosed containing hydroxy tertiary arylamines for hole transport. Three related U.S. Patents are U.S. Pat. Nos. 6,143,452; 6,203,692, and 6,265,122.

Recent articles in the chemical literature have discussed sol-gel networks, including silsesquioxanes, that have useful moieties, such as organic dyes, attached to the siloxane network through non-hydrolysable Si—C bonds, and equilibrium control addition through Si—O—C bonds. For example, E. Bellmann et al. reported the incorporation of a functional moiety, i.e., fluorinated tertiary arylamines and trimethoxyvinylsilane into polymer chains (*Chem. Mater.*, 2000, Vol. 12, p. 1349); however, due to low reactivity of trimethoxyvinylsilane in radical polymerization, the amount of silane moieties incorporated into the resulting polymer is limited. Perylenes are said to be incorporated into sol-gel networks by first coupling them to the silane and then forming a sol-gel network, as described in M. Schneider and K. Mullen, *Chem. Mater.*, 2000, Vol.12, p 352. Alternatively, a dye is said to be incorporated in the sol-gel formation process, as described in C. Sanchez and F. Ribot, *New J. Chem.*, 1994, Vol.18, p 1007.; C. Sanchez, F. Ribot, B. Debeau, J. Mater. Chem. 1999, 9, 35.; F. Ribot and C. Sanchez, *Comments on Inorganic Chemistry*, 1999, Vol. 20, p 327; and T. Suratwala et al., *Chem. Mater.*, 1998, Vol.10, p199.

However, there are several drawbacks for previously employed silsesquioxane overcoat layers. First, these silsesquioxane polymers are not entirely compatible with many commonly used organic materials employed for other functional layers in OPCs, and therefore, the overcoat layers do not bond well with other organic materials employed in such photoreceptors and easily peel off. Second, the organic silicone overcoat layers are usually brittle and crack under bending and mechanical fatigue. Third, due to the lack of charge transport properties, the silsesquioxane overcoat layers can build up high residual voltage during the electrophotographic process. Modifications of silsesquioxane materials have been developed, but generally do not overcome these weaknesses.

As can be seen, it would be desirable to develop silsesquioxane polymers with improved physical and chemical properties which could be used as a sol-gel precursor for preparation of relatively hard, protective coatings having hole transport capabilities that would be desirable for use in electrographic elements.

SUMMARY OF THE INVENTION

In one aspect, the invention relates to a polymer comprising structural units having the formula:

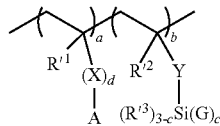

wherein:
A is a tertiary arylamine charge transport moiety;
X is a divalent bridging moiety;
Y is a divalent bridging moiety;
$R'^1$ and $R'^2$ are independently hydrogen or a $C_{1-4}$ alkyl;
G is independently a hydrolysable group;
$R'^3$ is independently a $C_{1-18}$ alkyl, a $C_{1-10}$ fluoroalkyl, or a $C_{6-12}$ substituted or unsubstituted aryl;
c is an integer from 1 to 3;
d is 0 or 1;
a is a mole fraction of from about 0.01 to about 0.99;
b is a mole fraction of from about 0.99 to about 0.01; and
a+b is 1.00 or less.

In another aspect, the invention relates to a silsesquioxane comprising the condensed reaction product of a charge transport polymer comprising structural units of the formula:

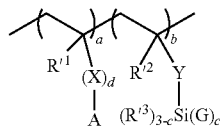

wherein:
A is a tertiary arylamine charge transport moiety;
X is a divalent bridging moiety;
Y is a divalent bridging moiety;
G is independently a hydrolysable group;
$R'^1$ and $R'^2$ are independently hydrogen or a $C_{1-4}$ alkyl;
$R'^3$ is independently a $C_{1-18}$ alkyl, a $C_{1-10}$ fluoroalkyl, or a $C_{6-12}$ substituted or unsubstituted aryl;
c is an integer from 1 to 3;
d is 0 or 1;
a is a mole fraction of from about 0.01 to about 0.99;
b is a mole fraction of from about 0.99 to about 0.01; and
a+b is 1.00 or less, with optionally at least one additional silane monomer having at least one hydrolysable group thereon.

In another aspect, the invention relates to a polymer comprising the reaction product of:
a) at least one vinyl-substituted, tertiary arylamine monomer having the general formula:

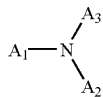

wherein:

$A_1$, $A_2$ and $A_3$ are independently a $C_{1-6}$ alkyl or $C_{6-50}$ substituted or unsubstituted aryl group, with the proviso that at least one of $A_1$, $A_2$ and $A_3$ is an aryl group substituted with a vinyl group having the formula $CH_2=C(R)-(X)_d-$, wherein:

R is hydrogen or a $C_{1-4}$ alkyl;

X is a divalent bridging moiety; and d is 0 or 1, with b) at least one vinyl-substituted silane monomer having the formula:

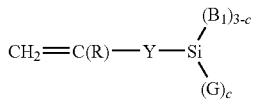

wherein:

R is hydrogen or a $C_{1-4}$ alkyl;

Y is a divalent bridging moiety;

$B_1$ is independently a $C_{1-18}$ alkyl, a $C_{1-10}$ fluoroalkyl, or a $C_{6-12}$ substituted or unsubstituted aryl;

G is independently a hydrolysable group; and c is an integer from 1 to 3.

In other aspects, the invention relates to silsesquioxane compositions comprising the above-described polymers.

In another aspect, the invention relates to an electrophotographic element comprising:

an electrically conducting layer;

a charge generating layer overlying said electrically conducting layer; and a first charge transport layer overlying said electrically conducting layer, said first charge transport layer comprising the condensed reaction product of a charge transport polymer comprising structural units having the formula:

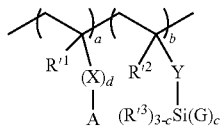

wherein:

A is a tertiary arylamine charge transport group;

X is a divalent bridging moiety;

Y is a divalent bridging moiety;

G is independently a hydrolysable group;

$R'^1$ and $R'^2$ are independently hydrogen or a $C_{1-4}$ alkyl;

$R'^3$ is independently a $C_{1-18}$ alkyl, a $C_{1-10}$ fluoroalkyl, or a $C_{6-12}$ aryl or substituted aryl;

c is an integer from 1 to 3;

d is 0 or 1;

a is a mole fraction of from about 0.01 to about 0.99;

b is a mole fraction of from about 0.99 to about 0.01; and a+b is 1.00 or less, with optionally, at least one additional silane monomer having at least one hydrolysable group thereon.

In embodiments, the charge transport layer of the electrophotographic element comprises the condensed reaction product which is a silsesquioxane, from a polar solvent medium or polar solvent or water miscible organic solvent (such as a mixture of water and an alcohol as exemplified hereinafter or methanol, ethanol, isopropyl alcohol, methyl isobutyl ketone, water and mixtures thereof) of the above-described charge transport polymers and optionally, at least one additional silane monomer that has at least one hydrolysable functional group thereon capable of being hydrolyzed and condensed with the charge transport polymer. In other embodiments, the at least one additional silane monomer is an alkyl trialkoxysilane monomer as more fully described hereinafter.

DETAILED DESCRIPTION OF THE INVENTION

The present invention relates to novel polymers comprised of tertiary aryl amine moieties which can function as hole transport agents, and also reactive silane groups that permit the polymers to be condensed into a silsesquioxane-type polymer. These silsesquioxanes can be coated onto substrates to form abrasion-resistant layers having hole transport properties useful in devices such as light-emitting diodes (OLEDs) and organic electrophotographic elements such as photoreceptors or photoconductors (OPCs). Furthermore, the polymers can also be used in their own right as a charge transport agent in place of conventional materials used in preparing a charge transport layer. The new compositions also have excellent charge transporting properties, good resistance to physical and chemical exposures when used in an electrophotographic process, and improved compatibility with other polymer binders used in OLED or OPC devices. The compositions also have an additional advantage of not being humidity sensitive, because they are insulators that are able to transport holes. Thus, unlike previously known silsesquioxanes which are polyelectrolytes that transport charge primarily by ionic means, the present compositions do not suffer from image degradation resulting from lateral image spread at high humidity levels.

Overcoats comprising the silsesquioxanes or the condensed reaction product of the charge transport polymer of Formula I below of the invention desirably have a thickness of from about 0.5 to about 10 microns, and preferably from about 0.75 to about 5 microns, and more preferably from about 1 to about 3 microns. As a further advantage, the silsesquioxanes can be coated onto a substrate from a solution which employs a variety of solvents. If the silsesquioxane is to be used as a primary charge transport layer in the device or electrophotographic element, the thickness of the silsesquioxane layer or the charge transport layer can be as high as about 40 microns.

The charge transport polymers, in embodiments, comprise structural repeat units that can be represented by Formula I:

Formula I:

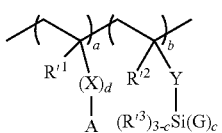

wherein:

A is a tertiary arylamine charge transport moiety, which moiety in preferred embodiments has a solution oxidation potential of from about 0.6 to about 1.2 volts versus a standard calomel electrode ("SCE");

X is a divalent bridging moiety, which in preferred embodiments is selected from an ester residue, i.e., —COO— or —OCO—; oxygen; an arylene moiety having up to about 18 carbon atoms; an alkylene moiety having up to about 6 carbon atoms; or combinations thereof;

Y is a divalent bridging moiety, which in preferred embodiments is selected from an ester residue, i.e., —COO— or —OCO—; oxygen; an arylene moiety having up to about 18 carbon atoms; an alkylene moiety having up to about 6 carbon atoms; or combinations thereof;

$R^{r1}$ and $R^{r2}$ are independently hydrogen or a $C_{1-4}$ alkyl;

G is independently a hydrolysable group, which is preferably selected from halogen, hydroxyl, or $C_{1-6}$ alkoxy groups;

$R^{r3}$ is independently a $C_{1-18}$ alkyl, a $C_{1-10}$ fluoroalkyl, or a $C_{6-12}$ substituted or unsubstituted aryl;

c is an integer from 1 to 3;

d is 0 or 1;

a is a mole fraction of from about 0.01 to about 0.99;

b is a mole fraction of from about 0.99 to about 0.01; and a+b is 1.00 or less.

In Formula I, the mole fractions a and b are based on total moles of monomer used to prepare the polymer. The $R^{r1}$, $R^{r2}$, and $R^{r3}$ groups are preferably hydrogen or a $C_{1-3}$ alkyl, and more preferably hydrogen or methyl. Also, c is preferably 2, and more preferably 3, so as to give a higher degree of crosslinking when the polymer is converted into a silsesquioxane.

The above charge-transport polymer may comprise other structural units to modify the properties of the resulting polymer. This can be done by incorporation of other monomers with a reactive vinyl group, such as styrene, vinyl acetate, methyl methacrylate and hydroxyethyl methacrylate (HEMA) with the primary monomers used to prepare the polymer, as discussed hereinafter. Accordingly, the sum of a+b can be less than 1.00 in the above formula where such other monomers are employed. Preferably, the amount of such other monomers is minor relative to the amount of primary monomers employed, such that the sum of a+b is at least about 0.7.

In terms of proportions for the two repeat units in Formula I, preferably a is a mole fraction from about 0.1 to about 0.9, more preferably from about 0.15 to about 0.85, and most preferably from about 0.25 to about 0.8, based on total moles of monomer employed to obtain such repeat units. In general, a higher amount of the repeat unit comprising the charge transport moiety will provide for greater charge transport capability, but an amount providing a mole fraction for a of greater than 0.8 is less preferred due to potentially reduced mechanical properties. Thus, in Formula I, b is preferably from about 0.9 to about 0.1, more preferably from about 0.85 to about 0.15, and most preferably from about 0.75 to about 0.2.

Preferred charge transport moieties (CTM) capable of transporting holes are tertiary aryl amine groups (represented by—A—in Formula I) and include for example the following structures:

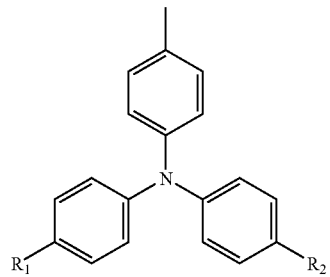

CTM I

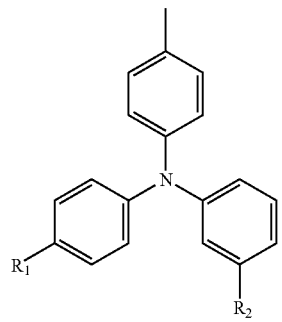

CTM II

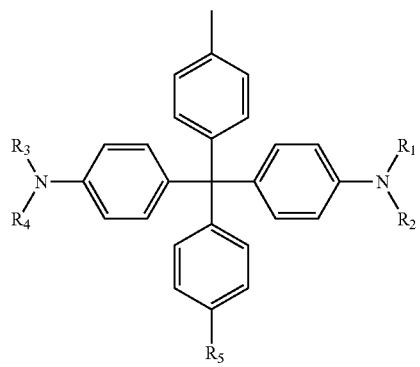

CTM III

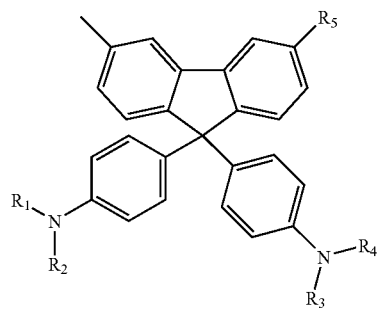

CTM IV

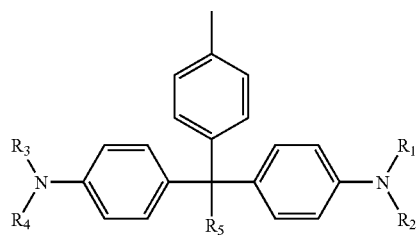

CTM V

-continued
CTM VI
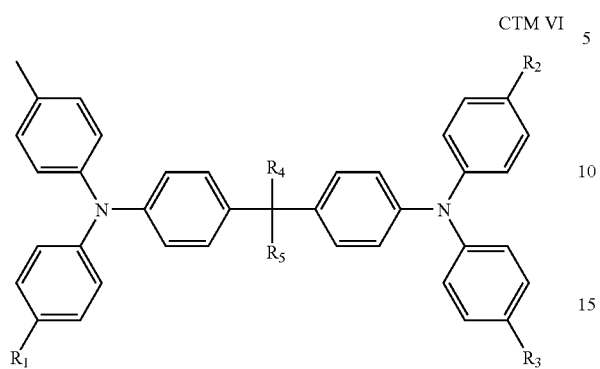
CTM VII
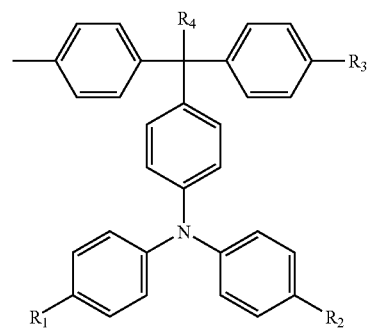
CTM VIII
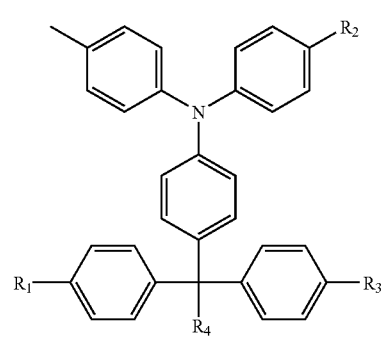
CTM IX
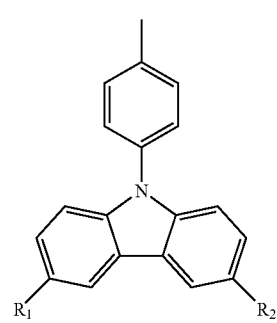
CTM X
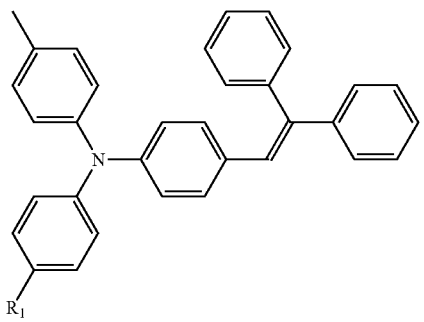
CTM XI
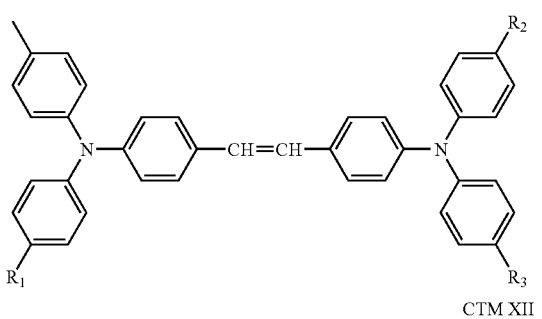
CTM XII
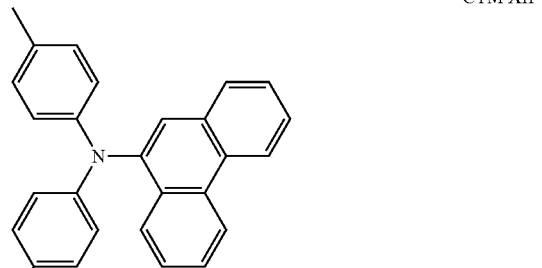
CTM XIII
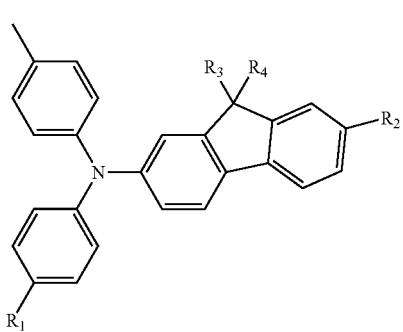
CTM XIV
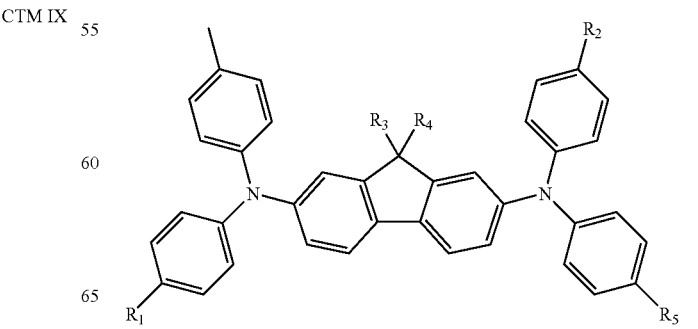

CTM XV
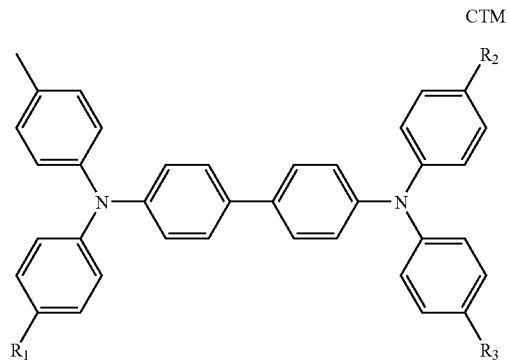

CTM XVI
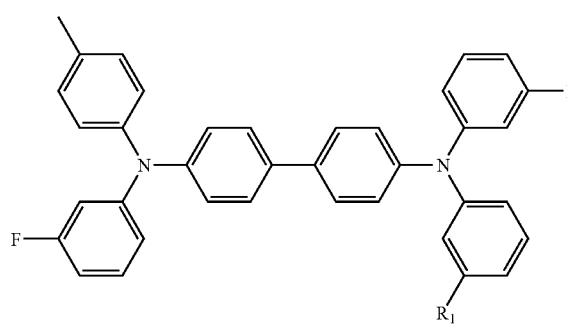

CTM XVII
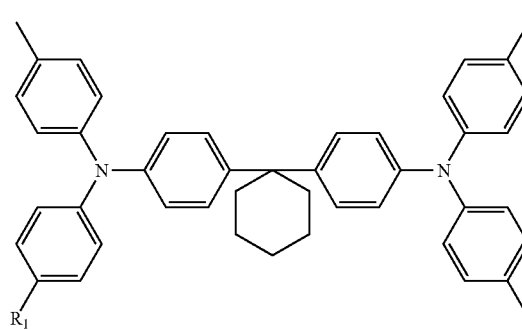

CTM XVIII
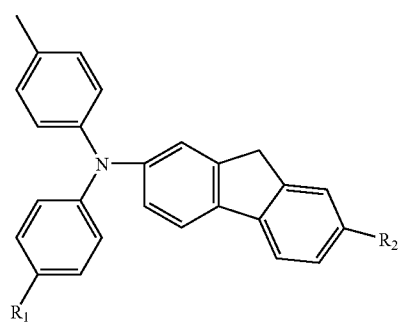

CTM XIX
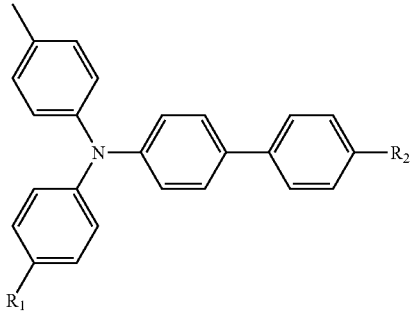

CTM XX
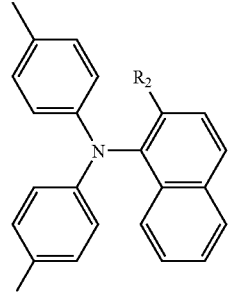

CTM XXI
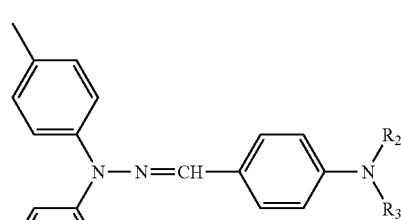

CTM XXII
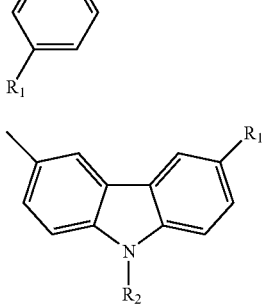

In the formulas for CTM I to CTM XXII listed above, the $R_1$, $R_2$, $R_3$, $R_4$ and $R_5$ groups are independently hydrogen, an alkyl group having from 1 to about 6 carbon atoms, or an alkoxy group having from 1 to about 6 carbon atoms.

The polymers of the invention can be obtained by polymerization of a mixture comprising at least one of a first type of vinyl-containing monomer having reactive silane groups, which groups are capable of being condensed in a silsesquioxane type reaction, with at least one of a second type of vinyl-containing monomer having a charge transport moiety (CTM) incorporated therein. The resulting polymer can then be used as a sol-gel precursor to make a silsesquioxane composition and electrophotographic elements according to the invention as described herein.

The first type of vinyl-containing monomer having reactive silane groups thereon is an organic silicon-containing compound having at least one hydrolysable group substituent bonded to the silicon atom. By "hydrolysable group" as used herein, it is meant a group that is capable of being hydrolyzed in a silsesquioxane reaction as described hereinafter, and in preferred embodiments, halogen (such as fluorine, chlorine, bromine, or iodine), hydroxyl, or $C_{1-6}$ alkoxy (such as methoxy, ethoxy, propoxy, butoxy, or methoxyethoxy) groups. In addition, a reactive vinyl group is indirectly bonded to the silicon atom through a divalent organic bridging moiety, which divalent organic moiety is then bonded directly to the silicon atom. While not wishing to be bound by theory, it is believed that indirect bonding of the reactive vinyl group to the silicon atom provides a monomer having greater reactivity in radical polymerization and therefore the monomer can be incorporated in relatively large amounts into the resulting polymer. This permits the polymer to be used more effectively in preparation of a silsesquioxane composition that can be advantageously used in an overcoat layer in an electrophotographic element or other device.

In general, preferred vinyl-containing monomers having reactive silane groups thereon correspond to the structure of Formula II, as follows:

Formula II:

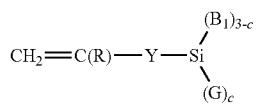

wherein:

R is hydrogen or a $C_{1-4}$ alkyl;

Y is a divalent organic bridging moiety as previously described;

$B_1$ is independently a $C_{1-18}$ alkyl, a $C_{1-10}$ fluoroalkyl, or a $C_{6-12}$ substituted or unsubstituted aryl;

G is independently a hydrolysable group as previously described; and c is an integer from 1 to 3.

The divalent bridging moiety (the Y moiety in Formula II) may be any moiety which is substantially inert in the polymerization reaction between the two types of monomers, and which also does not sterically hinder the polymerization. Examples of preferred divalent bridging moieties include divalent organic moieties, such as the residue of an ester (—COO— or —OCO—), an oxygen; an arylene moiety having up to about 18 carbon atoms, and preferably a phenylene moiety; an alkylene moiety having up to about 6 carbon atoms, or combinations thereof.

Generally, the reaction of the siloxane monomer is limited when the number of hydrolysable groups is one, therefore, it is preferred that c is at least 2 and more preferably 3.

Examples of vinyl-containing monomers having reactive silane groups thereon are methacryloxypropyl trimethoxysilane and styrylethyl trimethoxysilane, both of which are exemplified in the examples which follow hereinafter. Other monomers include methacryloxypropyl trichlorosilane, methacryloxypropyl triethoxysilane, methacryloxypropyl trimethoxysilane, methacryloxypropyl tris(methoxyethoxy) silane, 3-methacryloxypropyl dimethylchlorosilane, methacryloxypropyl dimethylethoxysilane, methacryloxypropyl dimethylmethoxysilane, methacryloxypropyl methyldichlorosilane, methacryloxypropyl methyldiethoxysilane, methacryloxypropyl methyldimethoxysilane, (methacryloxymethyl) dimethylethoxysilane, methacryloxymethyl triethoxysilane, methacryloxymethyl trimethoxysilane, o-(methacryloxyethyl)-N-(triethoxysilylpropyl)urethane, and N-(3-methacryloxy-2-hydroxypropyl)-3-aminopropyl triethoxysilane, all of which are available commercially from Gelest, Inc. of Tullytown, Pa.

The second type of monomer employed is one having both a reactive vinyl group and also a charge transport moiety (CTM) incorporated therein. The charge transport moiety (CTM) is a chemical structural unit or a residue of a charge transportable compound which shows an electron or hole mobility and which is covalently bound to the polymer. Such charge transport moiety preferably provides a solution oxidation potential of from about 0.6 to about 1.2 volts as determined by reference to a SCE. Preferred charge transport moiety structural units include the CTM structures previously mentioned, wherein the starting monomer has at least one aromatic ring substituted with a vinyl functional group so that it may be copolymerized with the vinyl-containing monomer having reactive silane groups.

In preferred embodiments, the vinyl-containing monomers having a charge transport moiety (CTM) incorporated therein are vinylated, tertiary aryl amine compounds represented by Formula III:

wherein:

$A_1$, $A_2$ and $A_3$ are independently a $C_{1-6}$ alkyl or $C_{6-50}$ substituted or unsubstituted aryl group, with the proviso that at least one of $A_1$, $A_2$ and $A_3$ is an aryl group substituted with a vinyl group having the formula $CH_2=C(R)-(X)_d-$, where:

R is hydrogen or a $C_{1-4}$ alkyl;

X is a divalent bridging moiety, which in preferred embodiments is selected from an ester residue, i.e., —COO— or —OCO—; oxygen; an arylene moiety having up to about 18 carbon atoms; an alkylene moiety having up to about 6 carbon atoms; or combinations thereof; and d is 0 or 1.

Where $A_1$, $A_2$ or $A_3$ in Formula III are aryl, they may each independently be an aromatic ring or fused-ring compound. The term "aryl," when used alone herein, means any aromatic radical, whether fused or not, derived from an aromatic hydrocarbon molecule by removal of one hydrogen atom. Illustrative examples of suitable aryls or fused-ring aromatic compounds incorporated in the arylamine groups of the invention include, but are not limited to, anthracenyl, biphenyl, fluorenyl, napthyl, phenyl, phenanthracenyl, and pyrenyl. Other aryl groups for these compounds are triphenyl, benzanthracenyl, naphthacenyl, fluoroanthracenyl, acephenanthracenyl, aceanthracenyl, and chrysenyl.

The divalent organic bridging moiety (shown as X in Formula III) is optional and may be selected from the moieties previously described for the bridging moiety of Formula I. Accordingly, d is 0 or 1 depending on whether the divalent bridging moiety is present or not.

Vinylated, tertiary aryl amine monomers can be synthesized by any method wherein a vinyl group is substituted onto an aryl group of a tertiary aryl amine compound.

One method for vinyl group substitution is by the known Wittig reaction, as exemplified in the examples which follow hereinafter, which is generally a two-step synthesis. Initially, an aldehyde group is substituted into an aryl group of the tertiary aryl amine by reacting the amine with an excess of dimethylformamide in the presence of phosphorous oxychloride (POCl₃). Thereafter, the resulting aldehyde group can be converted to a vinyl group by reaction with equimolar (in reference to the aldehyde-substituted amine) amounts of methyltriphenyl phosphoniumbromide and n-butyllithium (2.5 M in hexane) in tetrahydrofuran. Thereafter, the desired vinylated tertiary aryl amine is recovered from the reaction mixture and purified, as desired.

Alternatively, the vinylated tertiary aryl amine monomers can be synthesized by monobrominating an aryl group of an arylamine compound and then replacing the bromide substituent in the resulting compound with a vinyl group, for example, by a palladium-catalyzed vinylation as referenced in U.S. Patent Application Publication US 2001/0017155 A1, the teachings of which are incorporated by reference herein in their entirety.

Polymerization of the at least one vinyl-containing monomer having reactive silane groups with at least one vinyl-containing monomer having a charge transport moiety (CTM) incorporated therein can be conducted by free radical polymerization. It is preferred to use a free radical polymerization initiator. However, if desired the reaction can be conducted by other polymerization method, such as ionic and coordination polymerization. The relative amount of each monomer employed is desirably within the range given above for the mole fraction of each monomer residue in the resulting polymer product, in other words, desirably the amount of vinyl-containing monomer having a charge transport moiety (CTM) therein is from about 1 mol % to about 99 mol %, preferably from about 10 mol % to about 90 mol %, more preferably from about 15 mol % to about 85 ml %, and most preferably from about 25 mol % to about 80 mol %, based on the total moles of both monomer types employed. The amount of vinyl-containing silane monomer would therefore desirably be from 99 mol % to about 1 mol %, preferably from about 90 mol % to about 10 mol %, more preferably from about 85 mol % to about 15 ml %, and most preferably from about 80 mol % to about 25 mol % on the same basis.

Suitable initiators include any of those known to the art for use in free radical polymerization, such as azo-type initiators, such as 2,2'-azobis(2,4 dimethylpentanenitrile). Other initiators that can be employed are peroxy compounds, such as benzoyl peroxide. The polymerization with initiators may be conducted at a temperature of from about 60 to about 100° C. for at least about 8 hours to substantially complete the reaction. The polymerization may be conducted in an inert organic solvent, such as toluene, benzene, bis(2-methoxyethyl)ether, or tetrahydrofuran; however, if desired the reaction can be conducted by other methods such as bulk, suspension, or emulsion polymerization.

The resulting polymer can then be used in preparing a silsesquioxane composition by hydrolysis and condensation of the reactive silane groups incorporated therein. Silsesquioxanes are generally known as a class of inorganic/organic glasses which can be formed at moderate temperatures by a type of procedure commonly referred to as a "sol-gel" process. In a sol-gel type process, silicon alkoxides are typically hydrolyzed at an initial temperature of from room temperature, i.e., about 25° C., and up to about 80° C. in an appropriate solvent, thereby forming the "sol"; then the solvent is removed resulting in a condensation and the formation of a cross-linked gel. A variety of solvents can be used. Aqueous, aqueous-alcoholic, and alcoholic solutions are generally preferred. Silsesquioxanes are conveniently coated from acidic alcohols, since the silicic acid form —Si(OH)₃ can be stable in solution for relatively long periods at ambient conditions. Condensation is related to the amount of curing a sample receives, with the temperature being from typically 60 to 100° C.

While the polymer can be used to prepare a silsesquioxane by itself and without reacting the polymer with another silane compound, it may be desirable to react the polymer with another silane compound for some applications, so that a silsesquioxane with modified properties is obtained, such as increased hardness, smoothness or low surface energy (good release) properties. An organic-based silsesquioxane also is desirable as it produces a photoreceptor overcoat that is generally more resistant to corona. Incorporation of the polymer comprising arylamine charge transport moieties into a silsesquioxane overcoat can also produce a photoreceptor which is rendered more resistant to charge build up during cycling. It also minimizes lateral image spread that has been previously observed for solid electrolyte silsesquioxanes under conditions of high relative humidity.

The polymer can be simply added to the sol-gel solution in a desired amount before coating, and can exhibit a variety of important advantages, such as: they do not require a metal, i.e., tin, condensation catalyst to establish the linkage into the silsesquioxane network; they can be soluble in an alcoholic sol-gel solution, which provides a polar coating solution that will resist marring or etching of the surface of the photoreceptor film onto which it is deposited; and they can be incorporated into a coating solution (such as a mixed solvent of water and alcohol) which is more environmentally acceptable.

Preparation of silsesquioxanes which include a polymer according to the invention is described hereinafter and more particularly in the examples which follow.

As mentioned above, an added silane monomer can be included in the sol gel solution used to prepare a silsesquioxane. Where an added silane compound is used, it is preferably at least one alkyltrialkoxysilane having the general structure shown in Formula IV:

   Formula IV:

wherein R¹ is an aliphatic, cycloaliphatic, or aromatic group containing up to about 18 carbon atoms, preferably an aliphatic, cycloaliphatic, or aromatic group containing 1 to about 12 carbon atoms, and R² is an alkyl group containing 1 to about 6 carbon atoms. Groups represented by R¹ can include substituent or connective moieties such as ethers, amides, esters, arylene, and the like. Preferably, however, R¹ is selected from the group consisting of alkyls or fluoroalkyls containing up to about 18 carbon atoms, preferably 1 to about 12 carbon atoms, cycloalkyls containing from 5 to about 12 carbon atoms, and aryls containing 6 to about 12 carbon atoms. More preferred R¹ groups are alkyl groups containing 1 to about 3 carbon atoms, with methyl being particularly preferred. An example of such a silane compound which is widely available is methyltrimethoxysilane.

The hydrolysis and condensation of silane compounds (sol-gels) by acid catalysis to form silsesquioxanes can be represented by the simplified synthesis scheme shown below, wherein R represents the remainder of the polymer structure according to one aspect of the invention herein, as well as a methyl group, if methyltrimethoxysilane is used as an added silane compound to make the silsesquioxane as previously mentioned:

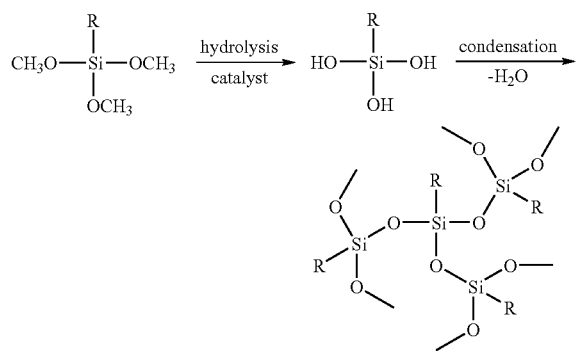

Silsesquioxane preparation by various sol-gel methods is disclosed in U.S. Pat. Nos. 5,731,117 and 5,693,442, the teachings of which are incorporated herein by reference in their entirety. In general, the silsesquioxane can be prepared by initially dissolving the charge transport polymer into a water miscible solvent, such as methyl isobutyl ketone (MIBK) and then adding other desired reactants, such as any added silane compound. After all reactants are in solution, a catalyst, water and a desired amount of other water miscible organic solvent, such as an alcohol, are added thereto.

Hydrolysis and condensation of the hydrolyzable groups on the polymer and any added silane compound can be conducted by a number of methods, such as those described by C. Jeffery Brinker and George W. Scherer in "Sol-Gel Science The Physics and Chemistry of Sol-Gel Processing" (Academic Press, Inc. San Diego, Calif. 1990).

As mentioned in the patents and patent application previously incorporated herein by reference, hydrolysis and condensation of silanes can be catalyzed by adding colloidal silica, i.e., silica particles that are stabilized by either an acidic or basic surface charge, and can influence the mechanical properties of the resulting silsesquioxane coating. Preferably, up to about 30 weight percent of colloidal silica, based on the amount of silsesquioxane is added to the mixture. More preferably, the amount of added colloidal silica is about 5 to about 10 weight percent. A preferred colloidal silica, stabilized with a small amount of sodium salt of silanol, is LUDOX™ LS, available from E.I. duPont de Nemours & Co. of Wilmington, Del. As the volatile acetic acid, alcohol, and other solvents in the sol-gel are removed during the reaction, the sodium salt of the silanol remains to act as a basic condensation catalyst for the formation of the silsesquioxane. The silsesquioxane network forms through Si—O—Si linkages of added silane compounds, while the charge transport polymer would be expected to condense therewith to form part of the siloxane network through Si—C linkages. Other bases, such as ammonia or hydroxides or acetates of alkali and alkaline earth metals, are also appropriate catalysts for the hydrolysis and condensation, in place of the acetic acid and colloidal silica.

In a typical procedure, an organic co-solvent such as methyl isobutyl ketone (MIBK) is added to help dissolve the charge transport polymer, which is then added at a desired level. The solution is then diluted with an alcohol, such as ethanol or isopropanol. An added silane compound, methyltrimethoxysilane is then added and the mixture is acidified with acetic acid, and the silane groups of the reactants are hydrolyzed with approximately 2 equivalents of water. Colloidal silica is also added with the acid and water. The charge transport polymers according to the invention are soluble in the solvents used to prepare the silsesquioxane, giving clear films when coated over a photoreceptor at up to 30 weight percent loadings.

The silsesquioxane compositions of the invention may be coated by any known coating methods, such as blade coating, onto an exposed surface of a photoconductor to provide an electrophotographic element.

The electrophotographic elements of the invention can be of various types, including both those commonly referred to as single layer or single-active-layer elements and those commonly referred to as multiactive, or multiple-active-layer elements. Generally, the electrophotographic elements of the invention have multiple layers, since each element has at least an electrically conductive layer and one photogenerating (charge generating) layer, that is, a layer which includes a charge generation material, in addition to a silsesquioxane overcoat layer.

Single-active-layer elements are so named because they contain only one layer, referred to as the photoconductive layer, that is active both to generate and to transport charge in response to exposure to actinic radiation. Such elements can have an additional electrically conductive layer, as well as adhesive layers and charge blocking layers. In single-active-layer elements, the photoconductive layer contains charge-generation material to generate electron/hole pairs in response to actinic radiation and also a charge-transport material, such as the charge transport polymer according to an aspect of the invention disclosed herein, which is capable of transporting holes generated by the charge-generation material through the layer to effect discharge of the initially uniform electrostatic potential. The charge generation material is dispersed in a binder polymer which may be electrically insulating or transport active. The charge transport agent(s) may be dissolved, i.e., molecularly doped, in the binder polymer.

Multiple-active-layer elements are so named because they contain at least two active layers, at least one of which is capable of generating charge, that is, electron/hole pairs, in response to exposure to actinic radiation and is therefore referred to as a charge-generation layer (CGL), and at least one of which is capable of accepting and transporting charges generated by the charge-generation layer and is therefore referred to as a charge-transport layer (CTL). In the invention, multiple-active-layer elements have an electrically conductive layer, a CGL, a CTL, an overcoat layer (which can be a thin layer of silsesquioxane comprising the charge transport polymer disclosed herein), and any additional layers as known in the art, such as adhesive layers, smoothing layers, and charge blocking layers. The CGL contains charge-generation material and a polymeric binder. The CTL contains a charge-transport agent, which in embodiments, can comprise the charge transport polymer as disclosed herein, and a polymeric binder. Alternatively, the CTL layer can be a thicker layer of silsesquioxane comprising the charge transport polymer disclosed herein.

Single-active-layer and multiactive layer electrophotographic elements and their general preparation and use are known and are described in more detail, for example, in U.S. Pat. Nos. 4,701,396; 4,666,802; 4,578,334; 4,719,163; 4,175,960; 4,514,481 and 3,615,414, the disclosures of which are incorporated herein by reference in their entirety.

In preparing the electrophotographic elements of the invention, the components of the photogeneration layer, including binder and any desired addenda, are dissolved or dispersed together in a liquid to form an electrophotographic coating composition which is then coated over an appropriate underlayer, for example, a support and/or electrically conductive layer. The liquid is then allowed or caused to evaporate from the mixture to form the permanent photoconductive layer or CGL.

The polymeric binder used in the preparation of the coating compositions can be any of the many different binders that are useful in the preparation of electrophotographic layers. The polymeric binder is a film-forming polymer having a fairly high dielectric strength. In a preferred embodiment of the invention, the polymeric binder also has good electrically insulating properties. The binder should provide little or no interference with the generation and transport of charges in the layer. The binder can also be selected to provide additional functions. For example, adhering a layer to an adjacent layer; or, as a top layer, providing a smooth, easy to clean, wear-resistant surface. Representative binders are film-forming polymers having a fairly high dielectric strength and good electrically insulating properties. Such binders include, for example, styrene-butadiene copolymers; vinyl toluene-styrene copolymers; styrene-alkyd resins; silicone-alkyd resins; soya-alkyd resins; vinylidene chloride-vinylchloride copolymers; poly(vinylidene chloride); vinylidene chloride-acrylonitrile copolymers; vinyl acetate-vinyl chloride copolymers; poly(vinyl acetals), such as poly(vinyl butyral); nitrated polystyrene; poly(methylstyrene); isobutylene polymers; polyesters, such as poly{ethylenecoakylenebis(alkyleneoxyaryl)phenylenedicarboxylate}; phenol-formaldehyde resins; ketone resins; polyamides; polycarbonates; polythiocarbonates; poly{ethylenecoisopeopyliden-2,2-bis(ethylenoxyphenylene)-terephthalate}; copolymers of vinyl haloacrylates and vinyl acetate such as poly(vinyl-m-bromobenzoate-covinyl acetate); chlorinated poly(olefins), such as chlorinated poly(ethylene); cellulose derivatives such as cellulose acetate, cellulose acetate butyrate and ethyl cellulose; and polyimides, such as poly{1,1,3-trimethyl-3-(4'-phenyl)-5-indane pyromellitimide}. Examples of binder polymers which are particularly desirable from the viewpoint of minimizing interference with the generation or transport of charges include: bisphenol A polycarbonates and polyesters such as poly>(4,4'-norbomylidene)diphenylene terephthalate-co-azelate.

Suitable organic solvents for forming the polymeric binder solution can be selected from a wide variety of organic solvents, including, for example, aromatic hydrocarbons such as benzene, toluene, xylene and mesitylene; ketones such as acetone, butanone and 4-methyl-2-pentanone; halogenated hydrocarbons such as dichloromethane, trichloroethane, methylene chloride, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used in forming the binder solution is typically in the range of from about 2 to about 100 parts of solvent per part of binder by weight, and preferably in the range of from about 10 to 50 parts of solvent per part of binder by weight.

Polymeric binders and charge transport materials and concentrations useful for the CGL or photoconductor layer are also useful for a CTL. The CTL can be solvent coated in the same manner as the charge generating layer. The coating composition can utilize the same solvents as in the charge generating layer. A similar process, preparing and then coating an appropriate coating composition, can be followed for charge transport layers.

Any charge generation and transport materials can be utilized in elements of the invention. Such materials include inorganic and organic (including monomeric organic, metallo-organic and polymeric organic) materials); for example, zinc oxide, lead oxide, selenium, phthalocyanine, perylene, arylamine, polyarylalkane, and polycarbazole materials, among many others.

CGL's and CTL's in elements of the invention can optionally contain other addenda such as leveling agents, surfactants, plasticizers, sensitizers, contrast control agents, and release agents, as known in the art.

Various electrically conductive layers or supports can be employed in electrophotographic elements of the invention, for example, paper (at a relative humidity above 20 percent) aluminum-paper laminates; metal foils such as aluminum foil, zinc foil, and the like; metal plates such as aluminum, copper, zinc, brass and galvanized plates; vapor deposited metal layers such as silver, chromium, vanadium, gold, nickel, aluminum and the like; and semiconductive layers such as cuprous iodide and indium tin oxide. The metal or semiconductive layers can be coated on paper or conventional photographic film bases such as poly(ethylene terephthalate), cellulose acetate, polystyrene, etc. Such conducting materials as chromium, nickel, etc. can be vacuum-deposited on transparent film supports in sufficiently thin layers to allow electrophotographic elements so prepared to be exposed from either side.

Electrophotographic elements of the invention can also include various additional layers known to be useful in electrophotographic elements in general, for example, subbing layers, baffler layers, and screening layers. In addition the electrophotographic element can comprise a second charge transport layer disposed between the a charge generating layer and a first charge transport layer. This second charge transport layer can comprise the charge transport polymer or condensed reaction residue of the charge transport polymer of the present invention. The baffler layer can overlie an electrically conducting layer.

The synthesis of charge transport monomers, preparation of polymers therefrom, and the characterization and application of the polymers into electrophotographic elements are listed in the examples which follow hereinafter. The Examples and Comparative Examples are presented to illustrate various embodiments of the invention, and should not be construed as limiting the scope of the present invention. All parts and percentages are by weight, and temperatures in degrees Celsius, unless otherwise indicated.

Specific Embodiments of the Invention

Synthesis of Organic Charge Transport Monomers

All chemicals in the synthesis schemes discussed hereinbelow, except where the preparation thereof is specifically described, are available from Sigma Aldrich, Inc. of Milwaukee, Wis. and are used directly as obtained without purification.

A.1. Synthesis Scheme for diphenylamino styrene

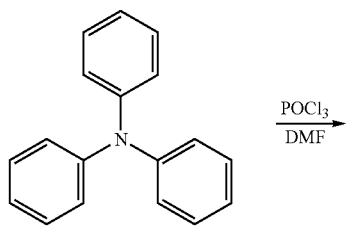

21

-continued

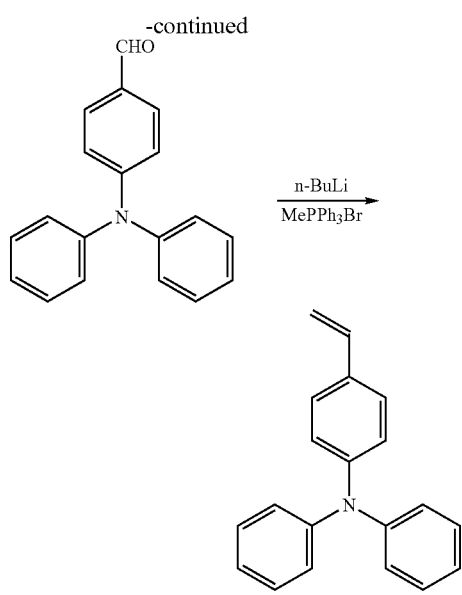

A.1.1. 4-formyltriphenylamine intermediate

A 1-liter 3-necked round bottom flask equipped with a mechanical stirrer, reflux condenser and addition funnel is charged with 196 grams (0.8 mol) of triphenyl amine and 400 ml of N,N-dimethylformamide (DMF), and then 122 grams (0.8 mol) of POCl₃ is added dropwise. The reaction mixture is heated to 90° C. over 1.5 hours and maintained at that temperature for 30 minutes to substantially complete the reaction.

Thereafter, the reaction mixture in the flask is poured into a 4-liter beaker containing a mixture of 1200 ml water, 1200 ml ethanol and 110 g of sodium acetate. Upon stirring for 30 minutes at 70° C., the mixture is cooled to room temperature. The resulting yellow solid is collected and washed with water until the filtrate is colorless. The solid is then dried, yielding 218 grams (yield of 99.9%) of product with a melting point of 129-130° C.

A.1.2. diphenylamino styrene

A 2-liter flask equipped with a mechanical stirrer, reflux condenser and addition funnel is charged with 71.7 grams (0.2 mol) of methyltriphenylphosphonium bromide and 600 ml of anhydrous tetrahydrofuran (THF). While stirring, a mixture of 88 ml of 2.5M n-BuLi (0.2 mol) in hexane is added rapidly. The reaction mixture is stirred for one hour at 25° C., and then 54.7 grams (0.2 mol) of the above-described 4-formyltriphenylamine intermediate in 300 ml tetrahydrofuran is added quickly. The resulting mixture is refluxed for one hour, after which half of the solvent is distilled from the reaction mixture and 1.3 liters of Ligroin is then added to the mixture to precipitate the byproduct of triphenylphosphine oxide. The precipitate is removed by filtration. Crude product is then purified by chromatography with a silica gel column and Ligroin eluent. The product is further purified by re-dissolving it into hexane and passing the solution through a basic alumina column. Evaporation of solvent and drying the resulting solid in vacuum yields 27.5 grams of a white crystalline product (yield of 50.9%); with a melting point of 92-93° C.; and elemental analysis of C: 88.18; H: 6.19; N: 5.40 (theoretically: C: 88.52; H: 6.31; N: 5.16).

22

A.2. Synthesis Scheme for di(p-tolyl)amino styrene

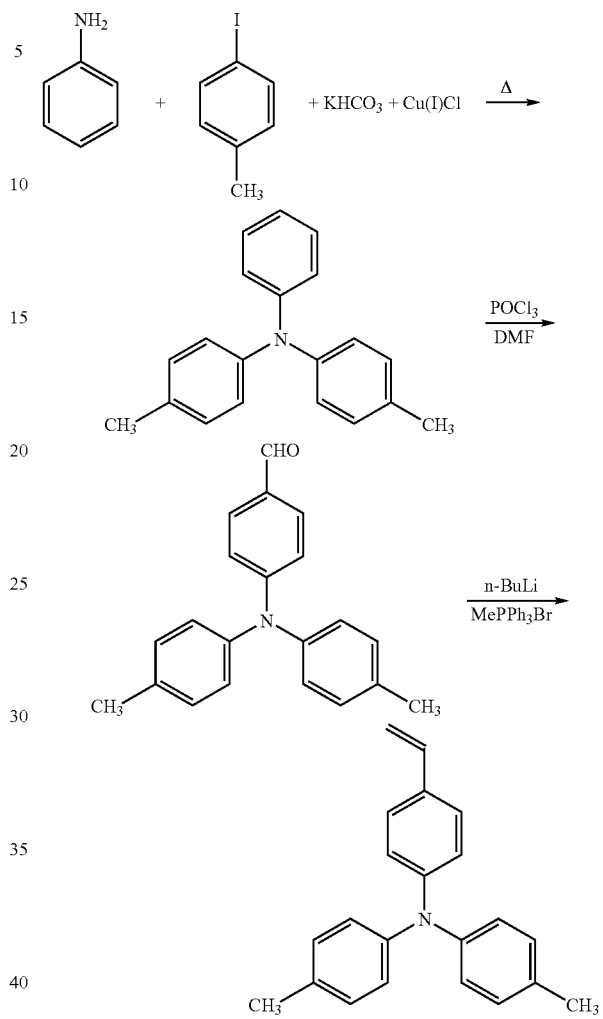

A.2.1. N,N-di(p-tolyl) aniline

A 2-liter 3-necked round bottom flask equipped with a mechanical stirrer, reflux condenser and thermometer is charged with 139.7 g (1.5 mol) of aniline, 727.2 g (3.3 mol) of iodotoluene, 255.0 g (2.6 mol) of potassium bicarbonate and 0.6 g of copper (I) chloride. The reaction mixture is quickly heated to 160° C. and maintained at 160-180° C. for seven days, after which it is cooled to 110° C. and 350 ml of toluene is added. The insoluble salts therein are filtered off and the filtrate is washed with water several times. The filtrate is concentrated to form an oil under vacuum, after which it is poured into acetonitrile to precipitate the product. The slurry is cooled, and the resulting solid is isolated by filtration and dried under vacuum to give 327.0 g (yield of 80%) of the desired product.

A.2.2. di(p-tolyl)amino benzaldhyde

The procedure used is substantially identical to that described above for the synthesis of 4-formyltriphenylamine. The resulting product of di(p-tolyl)amino benzaldhyde is isolated in 83% yield. Melting point is 104-105° C.

A.2.3. di(p-tolyl)amino styrene

The procedure used is substantially identical to that described above for the synthesis of diphenylamino styrene. The purified product is obtained as a white crystalline solid with a yield of 73.6%. Melting point is 69-71° C. with an elemental analysis of C: 88.67; H: 7.10; N: 4.63 (theoretically: C: 88.25; H: 7.07; N: 4.68).

A.3. Synthesis Scheme for di(p-anisyl)amino styrene

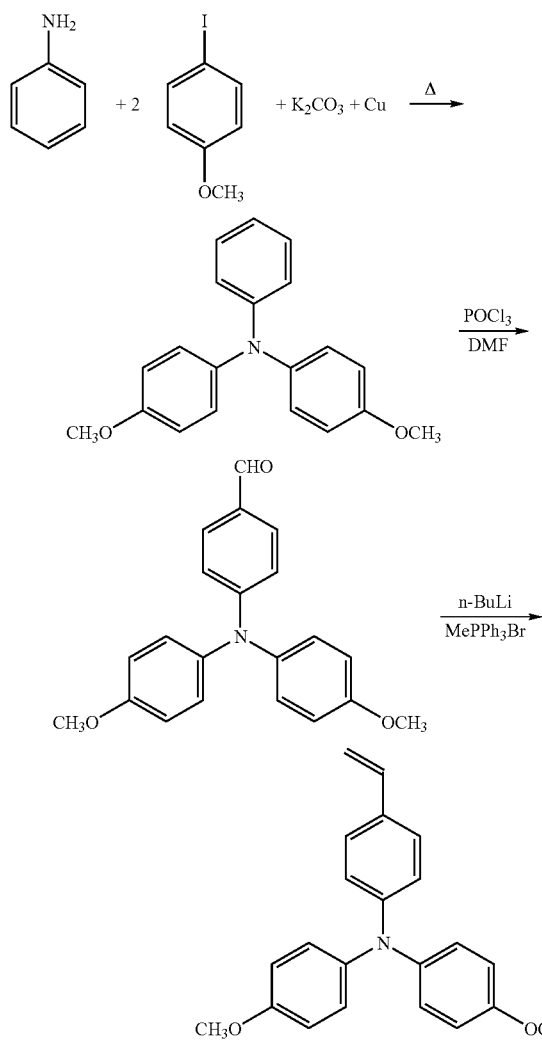

A.3.1. di(p-anisyl) aniline

A 2-liter 3-necked round bottom flask equipped with a mechanical stirrer, reflux condenser and thermometer is charged with 46.5 g (0.5 mol) of aniline, 346.0 g (1.5 mol) of 4-iodoanisole, 543 g (3.9 mol) of potassium carbonate, 92 g (1.5 mol) of copper powder and 700 ml decalin. The reaction mixture is heated to 160° C. and kept at 160-180° C. for seven days. The reaction mixture is cooled to room temperature and the resulting insoluble material is removed by filtration. The filtrate is concentrated and purified by passing through a chromatographic silica column with an eluent of methylene chloride and Ligroin (1:4 by volume) mixture. The elute containing the major product is collected and concentrated by removing 75 percent of the volatile solvents, during which some solid material precipitates. The mixture is added into 800 ml of isopropanol and cooled by immersion in dry ice/methanol mixture for 30 minutes. The solid is collected and dried under vacuum to yield 82 g (yield of 53%) of product.

A.3.2. di(p-anisyl)amino benzaldhyde

The procedure used is substantially identical to that described above for the synthesis of 4-formyltriphenylamine. The product of di(p-anisyl)amino benzaldhyde is isolated as a yellow solid with a 88% yield. Melting point is 99-100° C.

A.3.3. di(p-anisyl)amino styrene

The procedure used is substantially identical to that described above for the synthesis of diphenylamino styrene. The purified product is obtained as a white crystalline solid with a yield of 60%. Melting point is 69.5-71.5° C. and has an elemental analysis of C: 79.57; H: 6.29; N: 4.34 (theoretically: C: 79.73; H: 6.39; N: 4.23).

A.4. Synthesis Scheme for m,p-dianisylamino styrene

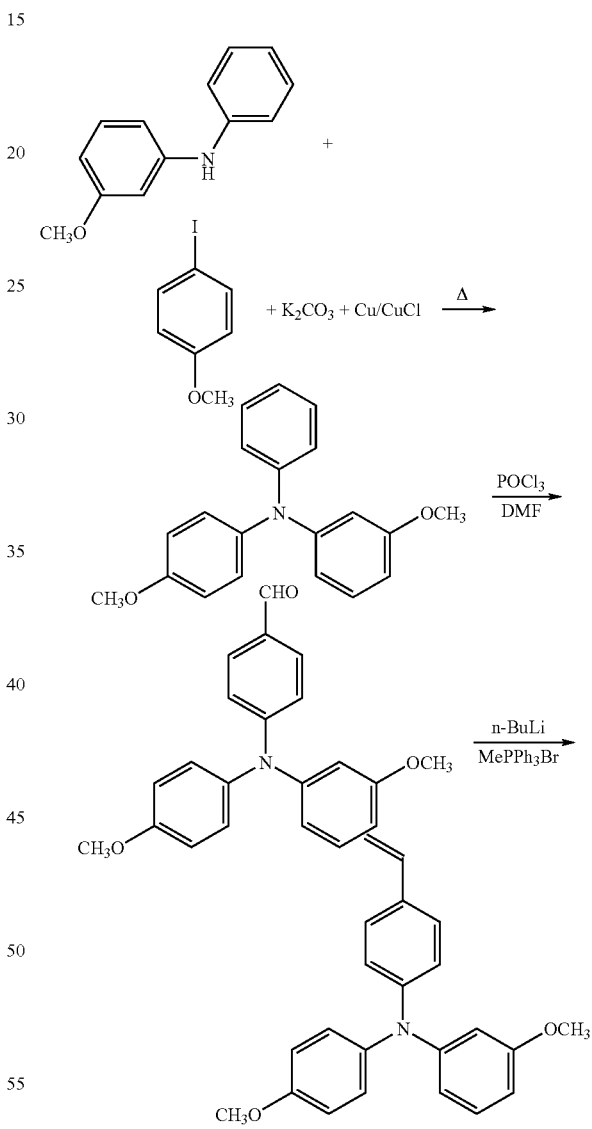

A.4.1. m,p-dianisyl aniline

A 2-liter 3-necked round bottom flask equipped with a mechanical stirrer, reflux condenser and thermometer is charged with 100.0 g (0.5 mol) of m-anisyl aniline, 133 g (0.6 mol) of 4-iodoanisole, 87 g (0.6 mol) of potassium carbonate, 30 g (1.5 mol) of copper powder, 2.0 g of copper (I) chloride and 500 ml decalin. The reaction mixture is heated to 175° C. and maintained at 175-180° C. for seven days, after which the mixture is cooled to room temperature and the insoluble material removed by filtration. The filtrate is concentrated and subsequently purified by chromatography (silica gel column, methylene chloride and Ligroin (1:4 by volume) mixture). The elute containing the major product is collected, concentrated, and purified by vacuum distillation. A clear liquid (128.0 g, yield of 70%) is collected at 185-190° C./0.2 mm Hg.

A.4.2. m,p-dianisylamino benzaldhyde

The procedure used is substantially identical to that described above for the synthesis of 4-formyltriphenylamine. The product of m,p-dianisylamino benzaldhyde is isolated as a light-yellow solid with 85.7% yield.

A.4.3. m,p-dianisylamino styrene

The procedure used is substantially identical to that described for the synthesis of diphenylamino styrene. The purified product is obtained as a white crystalline solid with 63% yield. Melting point: is 76-78° C. with an elemental analysis of C: 79.58; H: 6.28; N: 4.43 (theoretically: C: 79.73; H: 6.39; N: 4.23).

Synthesis of Organic Charge Transporting Polymers

The general copolymerization procedure followed is as follows:

Under an inert argon atmosphere, a total amount of 60 millimoles (mmol) of silane and charge transporting monomer mixture is dissolved in 100 ml of anhydrous toluene. The proportionate amount (molar ratio) for the two monomers within this total amount is shown in Table I below. A 90 milligram (mg) amount of an azo initiator, 2,2'-azobis(2,4-dimethylpentanenitrile) commercially available from Dupont, is then added to the solution. The solution is heated to 60° C. for 20 hours, followed by 100° C. for additional 5 hours. The contents are then cooled to room temperature, after which the polymer is precipitated into 1 liter of methanol, redissolved into 100 millilliters (ml) of toluene, and re-precipitated into 1 liter of hexane. The polymer is collected by filtration, washed with hexane several times, and dried at 1 milliTorr vacuum overnight.

The molecular weights of isolated polymers are analyzed by size-exclusion chromatography (SEC) in uninhibited tetrahydrofuran (THF) using three 7.5 millimeters (mm)×300 mm PIgel mixed-C columns obtained from Polymer Laboratories, Ltd. of Shropshire, UK, which are calibrated with narrow-molecular-weight distribution polystyrene standards.

The relative ratio (in terms of moles) of the charge transport moieties and silane groups is measured by a MERCURY 300 MHz $^1$H NMR instrument available from Varian, Inc. of Palo Alto, Calif., based on integration of the peaks in aromatic region versus all other peaks below 4.0 ppm.

The glass transition temperatures of polymers is determined by use of a DSC 2920 Differential Scanning Calorimeter available from TA Instrument of New Castle, Del.

A Model CHI660 electrochemical analyzer (available from CH Instruments, Inc., of Austin, Tex.) is employed to carry out the electrochemical measurements, and is equipped with a regular platinum disk electrode (1 mm diameter) and an ultramicroelectrode (25 μm) available from Bioanalytical Systems, Inc. of West Laffayette, Ind. Platinum wire serves as a counter electrode, and a saturated calomel electrode (SCE) is used as a reference electrode. Methylene chloride containing 0.1 M of tetrabutylammonium tetrafluoroborate is used as a supporting electrolyte. Cyclic voltammetry (CV) and Osteryoung square wave voltammetry (OSWV) are used to determine the oxidation potentials, which are estimated by averaging Epa (anodic peak potential) and Epc (cathodic peak potential).

EXAMPLE 1

Synthesis of Charge Transport Polymer with DTAS Monomer

Under an inert argon atmosphere, a 250 ml, three-necked, round bottom flask equipped with a magnetic stirrer, reflux condenser and thermometer is charged with 100 ml anhydrous toluene, 0.9 g (3 mmol) of di(p-tolyl) aminostyrene (DTAS) as prepared hereinabove, and 14.2 g (57 mmol) of methacryloxypropyl trimethoxysilane (MATMS) available from Gelest, Inc. of Tullytown, Pa. The MATMS monomer is passed through a inhibitor remover column available from Sigma Aldrich, Inc. just before being charged to the flask. The solution is stirred for 5 minutes and then 90 mg of 2,2'-azobis (2,4-dimethylpentanenitrile) initiator is added to the solution. The solution is then heated to 60° C. for 20 hours, followed by 100° C. for an additional 5 hours, after which the solution is cooled to room temperature and precipitated into 1 liter of methanol. The polymer precipitate is collected by filtration, re-dissolved into 100 ml toluene, and re-precipitated into 1 liter of hexane. The product is washed with hexane five times and dried at 1 milliTorr vacuum overnight to produce 7.1 g (yield of 47.1%) of polymer. The glass transition temperature (Tg), molecular weights (Mn—number average molecular weight; and Mw—weight average molecular weight), polydispersity (Mw/Mn), and E° ox (volts) for the polymer are determined by the analytical procedures described above. The results are shown in Table I.

EXAMPLES 2-5

Synthesis of Charge Transport Polymers with Higher Proportions of DTAS Monomer

The procedure of Example 1 is substantially repeated, except that the proportion of the charge transport monomer (DTAS) is varied to give the proportions shown in Table I. The results obtained are also shown in Table I.

Reaction Scheme for di(p-tolyl) aminostyrene (DTAS)

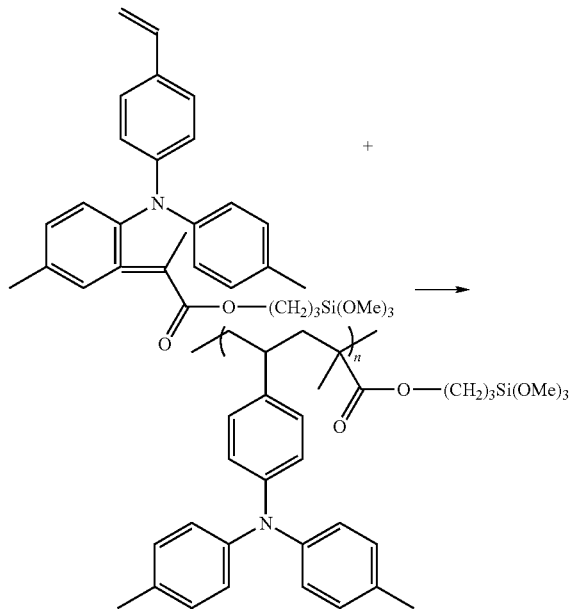

TABLE I

Copolymerization of DTAS Charge Transport Monomer and MATMS Silane Monomer

| Example No. | Feed ratio (mol %) DTAS/MATMS | Polymer composition DTAS/MATMS (mol %) | Yield (%) | Tg (° C.) | Mn g/mol | Mw g/mol | Mw/Mn | $E^0_{ox}$ (V) |
|---|---|---|---|---|---|---|---|---|
| 1 | 5/95 | 6.1/93.9 | 47.1 | −22.4 | 22200 | 49000 | 2.21 | — |
| 2 | 10/90 | 12.1/87.9 | 76.9 | −18.0 | 22700 | 63000 | 2.78 | — |
| 3 | 25/75 | 37.3/62.7 | 39.6 | 51.4 | 23600 | 41700 | 1.77 | — |
| 4 | 50/50 | 59.8/40.2 | 51.7 | 79.3 | 23500 | 40200 | 1.71 | 0.960 |
| 5 | 75/25 | 79.5/20.5 | 64.0 | 110.3 | 28800 | 101000 | 3.77 | 0.960 |

DTAS: di(p-tolyl) aminostyrene;
MATMS: methacryloxypropyl trimethoxysilane.

EXAMPLE 6

Synthesis of Charge Transport Polymer with DPAS Monomer

The procedure of Example 1 is substantially repeated, except that the charge transport monomer is diphenyl aminostyrene (DPAS) and the molar ratio of DPAS monomer to MATMS monomer is 50/50. The results obtained are shown in Table II.

Reaction Scheme for diphenyl aminostyrene (DPAS)

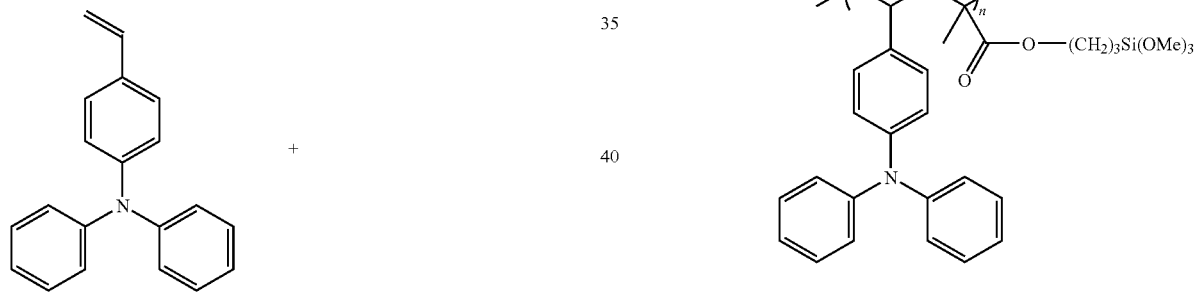

TABLE II

Copolymerization of DPAS Charge Transport Monomer and MATMS Silane Monomer

| Example No. | Feed ratio (mol %) DPAS/MATMS | Polymer composition DPAS/MATMS (mol %) | Yield (%) | Tg (° C.) | Mn | Mw | Mw/Mn | $E^0_{ox}$ (V) |
|---|---|---|---|---|---|---|---|---|
| 6 | 50/50 | 62.7/37.3 | 50 | 77.8 | 19700 | 39700 | 2.02 | 1.065 |

DPAS: diphenyl aminostyrene;
MATMS: methacryloxypropyl trimethoxysilane.

EXAMPLE 7

Synthesis of Charge Transport Polymer with DAAS Monomer

The procedure of Example 6 is substantially repeated, except that the charge transport monomer is di-anisyl aminostyrene (DMS). The molar ratio of DMS monomer to MATMS monomer is also 50/50. The results obtained are shown in Table III.

EXAMPLE 8

Synthesis of Charge Transport Polymer with i-DAAS Monomer

The procedure of Example 6 is substantially repeated, except that the charge transport monomer is m,p-di-anisyl aminostyrene (i-DAAS). The molar ratio of i-DAAS monomer to MATMS monomer is also 50/50. The results obtained are shown in Table IV.

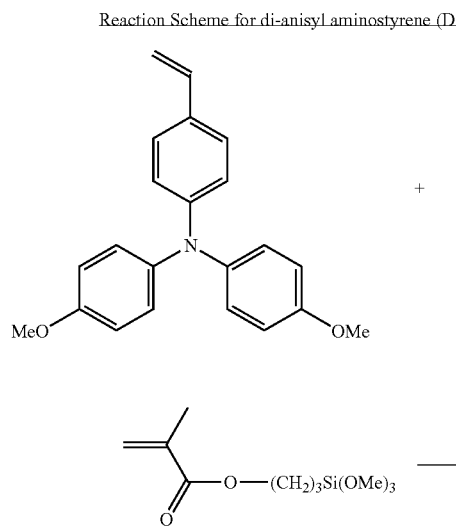

Reaction Scheme for di-anisyl aminostyrene (DAAS)

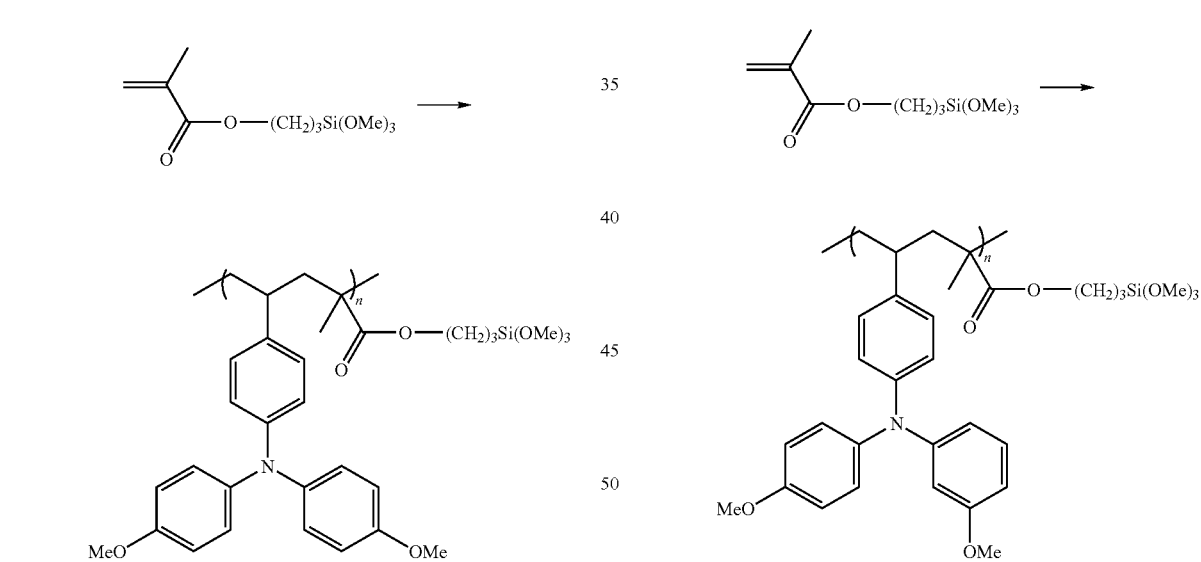

Reaction Scheme for m,p-di-anisyl aminostyrene (i-DAAS)

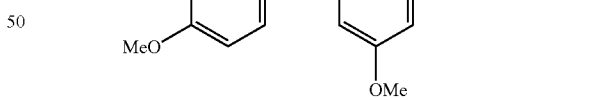

TABLE III

Copolymerization of DAAS Charge Transport Monomer and MATMS Silane Monomer

| Example No. | Feed ratio (mol %) DAAS/MATMS | Polymer composition DAAS/MATMS (mol %) | Yield (%) | Tg (° C.) | Mn | Mw | Mw/Mn | $E^0_{ox}$ (V) |
|---|---|---|---|---|---|---|---|---|
| 7 | 50/50 | 55.8/44.2 | 51.1 | 75.2 | 19300 | 40200 | 2.08 | 0.804 |

DAAS: di-anisyl aminostyrene

TABLE IV

Copolymerization of i-DAAS Charge Transport Monomer and MATMS Silane Monomer

| Example No. | Feed ratio (mol %) i-DAAS/MATMS | Polymer composition i-DPAS/MATMS (mol %) | Yield (%) | Tg (° C.) | Mn | Mw | Mw/Mn | $E^0_{ox}$ (V) |
|---|---|---|---|---|---|---|---|---|
| 8 | 50/50 | 55.6/45.4 | 63.3 | 71.9 | 23300 | 46500 | 2.0 | 0.870 | i-DAAS: m,p-di-anisyl aminostyrene;
MATMS: methacryloxypropyl trimethoxysilane.

EXAMPLES 9-10

Synthesis of Charge Transport Polymer with DTAS Monomer and SETMS Monomer

The procedure of Example 1 is substantially repeated, except that the silane monomer is styrylethyl trimethoxysilane (SETMS). The molar ratio of DTAS monomer to SETMS monomer is also 50/50 for Example 9, and 25/75 for Example 10. The results obtained are shown in Table V.

Reaction Scheme for di(p-tolyl) aminostyrene (DTAS) copolymerized with styrylethyl trimethoxysilane (SETMS)

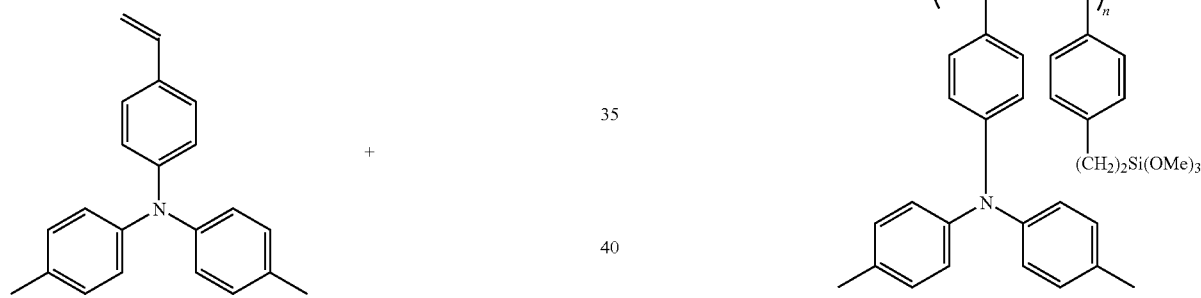

TABLE V

Copolymerization of DTAS Charge Transport Monomer and SETMS Silane Monomer

| Example No. | Feed ratio (mol %) DTAS/SETMS | Polymer composition DTAS/SETMS (mol %) | Yield (%) | Tg (° C.) | Mn | Mw | Mw/Mn | $E^0_{ox}$ (V) |
|---|---|---|---|---|---|---|---|---|
| 9 | 50/50 | 62.7/37.3 | 64.2 | 85.3 | 19200 | 40800 | 2.12 | 0.943 |
| 10 | 25/75 | 32.1/67.9 | 34.0 | 48.3 | 19300 | 41600 | 2.16 | |

DTAS: di(p-tolyl) aminostyrene;
SETMS: styrylethyl trimethoxysilane

EXAMPLE 11

Synthesis of Charge Transport Polymer with DAAS Monomer and SETMS Monomer

The procedure of Example 7 is substantially repeated, except that the silane monomer is styrylethyl trimethoxysilane (SETMS). The results obtained are shown in Table VI.

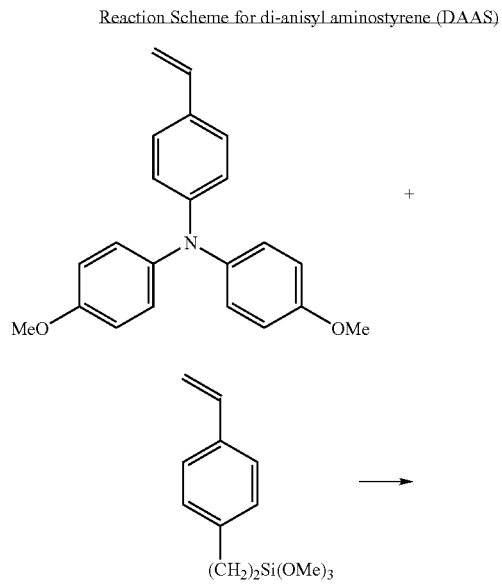

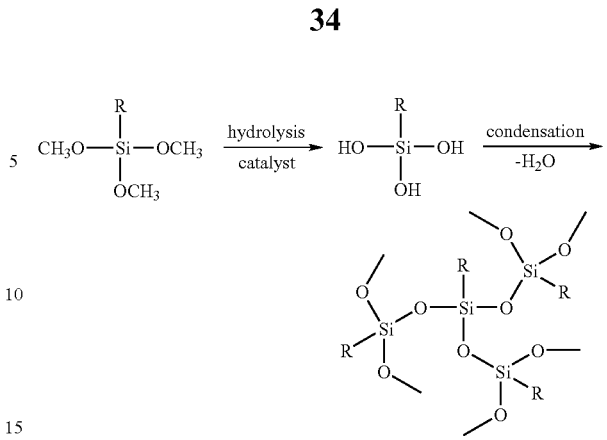

wherein R represents an organic bridging group, which in embodiments can be an alkyl group from the alkyl trialkoxysilane (methyl trimethoxysilane is used in the examples) or an aryl group from the repeat unit of the transporting polymers.

All chemicals are available from Sigma Aldrich. Water for hydrolysis of the silanes is purified on a MILLI-Q™ Plus Ultra Pure Water System available from Millipore Company of Bedford, Mass. The sol-gel solutions are prepared by the hydrolysis and condensation of the obtained charge transport polymers together with methyltrimethoxysilane. Three alternative solvent/catalysts systems are used, with the procedures being labeled as Procedure A, B or C as more fully described below.

Procedure A, Sol Gel Catalyzed by Acetic Acid

EXAMPLE 12

Electrophotographic Element with Silsesquioxane Overcoat

The preparation of the silsesquioxane overcoat layer in this example is a modification of the procedure described in U.S. Pat. No. 5,693,442, the teachings of which have been incorporated by reference herein.

A sol-gel formulation is initially prepared in a 100 ml round bottom flask as follows. The charge transport polymer (poly(DTAS-MATMS)) of Example 4 above, in an amount of 2.5 g (3.6 mmol of silane groups) is dissolved into 36.0 grams of methylisobutylketone (MLBK) solvent, followed by the dropwise addition of 2.5 g (18.4 mmol) of methyltrimethox-

TABLE VI

Copolymerization of DAAS Charge Transport Monomer and SETMS Silane Monomer

| Example No. | Feed ratio (mol %) DAAS/SETMS | Polymer composition DAAS/SETMS (mol %) | Yield (%) | Tg (° C.) | Mn | Mw | Mw/Mn | $E^0_{ox}$ (V) |
|---|---|---|---|---|---|---|---|---|
| P11 | 50/50 | 61.0/39.0 | 58.7 | 85.3 | 12900 | 24200 | 1.88 | 0.785 |

DAAS: di-anisyl aminostyrene;
SETMS: styrylethyl trimethoxysilane

Silsesquioxane Preparation

The general synthesis scheme for preparation of a silsesquioxane composition according to the invention is depicted as follows:

ysilane (MMS). The reaction mixture is stirred for an hour, and then is diluted by the dropwise addition of 18.0 g of isopropanol (IPA). After the reaction mixture is stirred for an additional 16 hours, glacial acetic acid (0.86 g, 14.3 mmol), 30% aqueous dispersion of LUDOX™ LS colloidal silica (0.5 g, containing 0.35 g water) previously acidified to pH 4 with glacial acetic acid, and water (0.45 g, 25 mmol) are added dropwise. The reaction mixture is stirred for one more day, after which the solution is heated and maintained at 80° C. for an additional 8 hours, followed by filtration through a 1 micron glass filter. The obtained filtrate is then ready for coating onto a substrate.

For Example 12, the substrate employed (Substrate A) is a near infrared sensitive photoconductor film made according to the procedures described in U.S. Pat. No. 5,614,342, the teachings of which are incorporated herein by reference in their entirety. In general, Substrate A is a 7 mils thick poly (ethylene terephthalate) film, which is initially vacuum coated with an electrically conducting layer of nickel of 400 Angstroms in thickness. A 0.5 micron thick charge generation layer (CGL) consisting of a 37.5/12.5/50 (in terms of a weight ratio) of oxotitanium phthalocyanine/oxotitanium tetrafluoro phthalocyanine/polyester ionomer mixture is solvent coated onto the nickel layer, and then another coating of a 2.0 micron thick charge transport layer (CTL) consisting of a 20/20/60 tri-p-tolylamine/1,1-bis-(N,N-di-p-tolylaminophenyl)cyclohexane/(5/1 MAKROLON™ polycarbonate and polyester) is solvent coated on top of the CGL layer.

A silsesquioxane layer is then formed on top of the CTL layer by coating the sol gel solution prepared above on top of the CTL layer using conventional equipment, i.e., a coating knife on a coating block. The thickness of the coating is controlled by the gauges of the coating knives. The so-coated substrate is then cured in an oven at 80° C. for 24 hours. The preparation parameters of the silsesquioxane composition and electrophotographic element are shown in Table VII below.

EXAMPLE 13

The procedure of Example 12 is substantially repeated, except as provided otherwise hereinafter. The electrophotographic element is substantially the same, except that the substrate employed is Substrate B described hereinafter.

Substrate B is essentially Substrate A, but without the coating of the CTL layer thereon. In other words, after the CGL layer is coated onto the nickel layer, there is no CTL layer coated thereon and the silsesquioxane layer is coated directly onto the CGL layer. The preparation characteristics of the silsesquioxane compositions and electrophotographic element are shown in Table VII below.

EXAMPLES 14-52

Electrophotographic Elements Prepared with Differing Silsesquioxane Overcoats and Substrates The procedures of Examples 12 and 13 are substantially repeated in Examples 14 to 52 to produce various electrophotographic elements coated with silsesquioxane overcoats. The substrate employed in each example (Substrate A or Substrate B), the charge transport polymer employed (polymers from Examples 1 to 11 as previously described hereinabove), and weight ratio of polymer to MTMS employed is shown in Table VII.

TABLE VII

Data For Examples 12-52

| Example | Substrate | Polymer (Example No.) | Polymer/ MTMS Ratio (wt) | Solvent | Catalyst | CTM % in sol-gel (wt %) |
|---|---|---|---|---|---|---|
| 12 | A | 4 | 1:1 | MIBK/IPA | acetic acid | 32.1 |
| 13 | B | 4 | 1:1 | MIBK/IPA | acetic acid | 32.1 |
| 14 | B | 4 | 1:1 | MIBK/IPA | acetic acid | 32.1 |
| 15 | A | 4 | 3:1 | MIBK/IPA | acetic acid | 48.1 |
| 16 | B | 4 | 3:1 | MIBK/IPA | acetic acid | 48.1 |
| 17 | B | 4 | 3:1 | MIBK/IPA | acetic acid | 48.1 |
| 18 | B | 4 | 3:1 | MIBK/IPA | acetic acid | 48.1 |
| 19 | A | 3 | 1:1 | MIBK/IPA | acetic acid | 20.9 |
| 20 | B | 3 | 1:1 | MIBK/IPA | acetic acid | 20.9 |
| 21 | B | 3 | 1:1 | MIBK/IPA | acetic acid | 20.9 |
| 22 | B | 3 | 1:1 | MIBK/IPA | acetic acid | 20.9 |
| 23 | A | 3 | 1:0 | MIBK/IPA | acetic acid | 41.8 |
| 24 | B | 3 | 1:0 | MIBK/IPA | acetic acid | 41.8 |
| 25 | A | 5 | 1:1 | MIBK/IPA | acetic acid | 41.2 |
| 26 | B | 5 | 1:1 | MIBK/IPA | acetic acid | 41.2 |
| 27 | B | 5 | 1:1 | MIBK/IPA | acetic acid | 41.2 |

TABLE VII-continued

Data For Examples 12-52

| Example | Substrate | Polymer (Example No.) | Polymer/MTMS Ratio (wt) | Solvent | Catalyst | CTM % in sol-gel (wt %) |
|---------|-----------|-----------------------|-------------------------|---------|----------|-------------------------|
| 28 | A | 2 | 1:1 | MIBK/IPA | acetic acid | 7.1 |
| 29 | B | 2 | 1:1 | MIBK/IPA | acetic acid | 7.1 |
| 30 | B | 2 | 1:1 | MIBK/IPA | acetic acid | 7.1 |
| 31 | A | 1 | 1:1 | MIBK/IPA | acetic acid | 3.65 |
| 32 | B | 1 | 1:1 | MIBK/IPA | acetic acid | 3.65 |
| 33 | B | 1 | 1:1 | MIBK/IPA | acetic acid | 3.65 |
| 34 | A | 6 | 1:1 | MIBK/IPA | acetic acid | 29.9 |
| 35 | B | 6 | 1:1 | MIBK/IPA | acetic acid | 29.9 |
| 36 | B | 6 | 1:1 | MIBK/IPA | acetic acid | 29.9 |
| 37 | A | 7 | 1:1 | MIBK/IPA | acetic acid | 31.4 |
| 38 | B | 7 | 1:1 | MIBK/IPA | acetic acid | 31.4 |
| 39 | B | 7 | 1:1 | MIBK/IPA | acetic acid | 31.4 |
| 40 | A | 8 | 1:1 | MIBK/IPA | acetic acid | 31.0 |
| 41 | B | 8 | 1:1 | MIBK/IPA | acetic acid | 31.0 |
| 42 | B | 8 | 1:1 | MIBK/IPA | acetic acid | 31.0 |
| 43 | A | 9 | 1:1 | MIBK/IPA | acetic acid | 32.7 |
| 44 | B | 9 | 1:1 | MIBK/IPA | acetic acid | 32.7 |
| 45 | B | 9 | 1:1 | MIBK/IPA | acetic acid | 32.7 |
| 46 | A | 10 | 1:1 | MIBK/IPA | acetic acid | 17.4 |
| 47 | B | 10 | 1:1 | MIBK/IPA | acetic acid | 17.4 |
| 48 | A | 10 | 3:1 | MIBK/IPA | acetic acid | 26.0 |
| 49 | B | 10 | 3:1 | MIBK/IPA | acetic acid | 26.0 |
| 50 | A | 11 | 1:1 | MIBK/IPA | acetic acid | 33.0 |
| 51 | B | 11 | 1:1 | MIBK/IPA | acetic acid | 33.0 |
| 52 | B | 11 | 1:1 | MIBK/IPA | acetic acid | 33.0 |

Procedure B, Sol Gel Catalyzed by Ammonia

EXAMPLES 53-54

Electrophotographic Elements Prepared with Silsesquioxane Overcoats Catalyzed By Ammonia The procedures of Examples 12 and 13 are substantially repeated in Examples 53-54 to produce electrophotographic elements coated with silsesquioxane overcoats wherein the silsesquioxane preparation is catalyzed by ammonia, rather than acetic acid. The substrate employed in Example 53 is Substrate A, while the substrate employed in Example 54 is Substrate B. The charge transport polymer employed in both. Examples 53-54 is the polymer from Example 9 as previously described hereinabove. The weight ratio of polymer to MTMS is 1:1 in both examples. The data for Examples 53-54 is shown in Table VIII.

The charge transport polymer (poly(DTAS-SETMS)), in an amount of 1.0 g (1.3 mmol of silane groups) is dissolved into 14.4 grams of MIBK solvent, followed by the dropwise addition of 0.5 g (3.7 mmol) of MTMS. The reaction mixture is stirred for an hour, and then is diluted by the dropwise addition of 6.0 g of IPA. After the mixture is stirred for an additional 16 hours, a 30% aqueous ammonia solution (0.05 g, 0.9 mmol) and water (0.15 g, 8.3 mmol) are added dropwise, respectively to the flask. The reaction mixture is stirred for one day, after which the solution is heated and maintained at 80° C. for additional 8 hours, followed by filtration through a 1-micron glass filter. The obtained filtrate is ready for coating as provided in Examples 12-13.

TABLE VIII

Data for Examples 53-54

| Example No. | Substrate | Polymer (Example No.) | Polymer/ MTMS Ratio (wt) | Solvent | Catalyst | CTM % in sol-gel (wt %) |
|---|---|---|---|---|---|---|
| 53 | A | 9 | 1:1 | MIBK/IPA | ammonia | 32.7 |
| 54 | B | 9 | 1:1 | MIBK/IPA | ammonia | 32.7 |

Procedure C, Sol Gel Catalyzed by Dibutyltin Dilaurate

EXAMPLES 55-56

Electrophotographic Elements Prepared with Silsesquioxane Overcoats Catalyzed by Tin Catalyst The procedures of Examples 12 and 13 are substantially repeated in Examples 55-56 to produce electrophotographic elements coated with silsesquioxane overcoats wherein the silsesquioxane preparation is catalyzed by dibutyltin dilaurate, rather than acetic acid. The substrate employed in Example 55 is Substrate A, while the substrate employed in Example 56 is Substrate B. The charge transport polymer employed in both Examples 55-56 is the polymer from Example 5 as previously described hereinabove. The weight ratio of polymer to MTMS is 1:1 in both examples. The data for Examples 55-56 is shown in Table IX.

The charge transport polymer (poly(DTAS-MATMS)), in an amount of 1.5 g (1.1 mmol of silane groups) is dissolved into 32 grams of methylene chloride (DCM), followed by the dropwise addition of 1.5 g (11.0 mmol) of MTMS and 0.03 g of dibutyltin dilaurate. After the reaction mixture is stirred for 10 minutes, water (0.44 g, 24.4 mmol) is added dropwise. The reaction mixture is stirred for 16 hours to become a homogenous solution, which is then ready for coating as provided in Examples 12-13.

The reaction mixture is stirred for one more day, after which the solution is heated and maintained at 80° C. for an additional 8 hours, followed by filtration through a 1 micron glass filter. The obtained filtrate is ready for coating as in Examples 12-13.

For Comparative Example C, there is no silsesquioxane overcoat layer applied to the topmost CTL layer of Substrate A.

The characterization data for Comparative Examples A-C is shown in Table X.

Characterization of Overcoated Electrophotographic Films

The thickness of a sol-gel coating is determined from a cross section image of the resulting electrophotographic element, which is cut with a microtome and mounted on a glass slide with a drop of mounting media. The image is viewed using transmitted light illumination and then captured on a microscope with a video camera.

Low intensity continuous exposure is used to evaluate the electrophotographic characteristics of the resulting element. It is carried out by charging the electrophotographic element sample to a desired surface potential and then exposing it through a "transparent" surface reading voltmeter probe. The surface potential is monitored continuously before and during the photo discharge. The light source is a shuttered xenon lamp monochromater. The irradiance is determined by placing a calibrated silicon photodetector in the light beam at the

TABLE IX

Data for Examples 55-56

| Example No. | Substrate | Polymer | Polymer/MTMS Ratio (wt) | Solvent | Catalyst | CTM % in sol-gel (wt %) |
|---|---|---|---|---|---|---|
| 55 | A | 5 | 1:1 | DCM | dibutyltin dilaurate | 41.2 |
| 56 | B | 5 | 1:1 | DCM | Dibutyltin dilaurate | 41.2 |

COMPARATIVE EXAMPLES A-C

A sol-gel solution without a charge transport polymer included therein is prepared as a comparative example by otherwise substantially following the procedures of Examples 12 and 13. For Comparative Examples A and C, the substrate employed is Substrate A, while the substrate employed for Comparative Example B is Substrate B.

The silsesquioxane coating solution for Comparative Examples A and B is made by mixing methyltrimethoxysilane (MTMS, 2.5 g, 18.4 mmol) and isopropanol (13 g). After the mixture is stirred for an additional 16 hours, acetic acid (0.66 g, 11.0 mmol), 30% aqueous dispersion of Ludox LS colloidal silica (0.50 g), previously acidified to pH 4 with glacial acetic acid, and water (0.44 g) are added dropwise.

film plane. Data is collected on a flat bed x-y recorder or digitally. The residual voltages are collected from the surface potentials in the low intensity continuous exposure experiments, in which the electrophotographic element samples are charged to −100 V, then exposed to 10 erg/($cm^2$s) of 775 nm light for 15 seconds.

Electrophotographic data shown in Table X below is generated at ambient conditions, i.e., a relative humidity (RH) of about 50%.

The data obtained for the electrophotographic elements of the invention as previously described show that the elements with the silsesquioxane overcoats according to the invention generally have good sensitivity, slow dark decay, and low residual potential after discharge.

The scratch resistance of the silsesquioxane overcoat layer on the electrophotographic elements is measured by a nanoscratch procedure as follows. A CSEM Nanoscratch Tester available from CSM Instrument of Peseux, Switzerland and equipped with a 136 degree conical, 3 micron radius diamond stylus is used to generate scratches on the overcoat layers of the elements under a 3 millinewton (mN) constant load. The resulting depth of the scratch, when visible, is determined using a Digital instrument DI 3000 Scanning Probe Microscopy (available from Veeco Instrument of Woodbury, N.Y.) with tapping mode.

The characterization results of the overcoated electrophotographic elements of the invention and Comparative Examples A and B are as follows in Table X:

TABLE X

Characterization Data for Examples 12-56 - Comparative Examples A-C

| Example No. | Substrate | Polymer (Ex. No.) | CTM % in sol-gel (wt %) | Sol-gel thickness (μ) | Residual Voltage – –Vtoe (V) | Scratch depth (nm) |
|---|---|---|---|---|---|---|
| 12 | A | 4 | 32.1 | 1.6 | 7 | 62.9 |
| 13 | B | 4 | 32.1 | 2.8 | 8 | — |
| 14 | B | 4 | 32.1 | 5.6 | 48 | — |
| 15 | A | 4 | 48.1 | 1.8 | 2 | 86.8 |
| 16 | B | 4 | 48.1 | 1.8 | 1 | — |
| 17 | B | 4 | 48.1 | 4.8 | 7 | — |
| 18 | B | 4 | 48.1 | 6.0 | 40 | — |
| 19 | A | 3 | 20.9 | 2.0 | 1 | 65.1 |
| 20 | B | 3 | 20.9 | 1.6 | 0 | 0.0 |
| 21 | B | 3 | 20.9 | 4.4 | 23 | 0.0 |
| 22 | B | 3 | 20.9 | 6.4 | 40 | 0.0 |
| 23 | A | 3 | 41.8 | 2.0 | 1 | — |
| 24 | B | 3 | 41.8 | 2.8 | 0 | — |
| 25 | A | 5 | 41.2 | 4.0 | 49 | — |
| 26 | B | 5 | 41.2 | 4.2 | 20 | — |
| 27 | B | 5 | 41.2 | 6.4 | 30 | — |
| 28 | A | 2 | 7.1 | 1.2 | 30 | — |
| 29 | B | 2 | 7.1 | 1.2 | 40 | — |
| 30 | B | 2 | 7.1 | 3.4 | 73 | — |
| 31 | A | 1 | 3.65 | 1.2 | 27 | 0.0 |
| 32 | B | 1 | 3.65 | 1.2 | 25 | — |
| 33 | B | 1 | 3.65 | 2.4 | 70 | — |
| 34 | A | 6 | 29.9 | 1.2 | 11 | 109.5 |
| 35 | B | 6 | 29.9 | 1.6 | 8 | — |
| 36 | B | 6 | 29.9 | 4.6 | 26 | — |
| 37 | A | 7 | 31.4 | 1.2 | 18 | 92.6 |
| 38 | B | 7 | 31.4 | 1.4 | 6 | — |
| 39 | B | 7 | 31.4 | 4.2 | 21 | |
| 40 | A | 8 | 31.0 | 1.6 | 19 | 111.5 |
| 41 | B | 8 | 31.0 | 2.0 | 17 | — |
| 42 | B | 8 | 31.0 | 6.8 | 47 | — |
| 43 | A | 9 | 32.7 | 1.6 | 6 | 129.3 |
| 44 | B | 9 | 32.7 | 1.4 | 0 | — |
| 45 | B | 9 | 32.7 | 3.8 | 6 | — |
| 46 | A | 10 | 17.4 | 1.6 | 8 | — |
| 47 | B | 10 | 17.4 | 1.8 | 0 | — |
| 48 | A | 10 | 26.0 | 1.6 | 11 | — |
| 49 | B | 10 | 26.0 | 1.8 | 5 | — |
| 50 | A | 11 | 33.0 | 1.2 | 17 | 115.6 |
| 51 | B | 11 | 33.0 | 1.4 | 4 | — |
| 52 | B | 11 | 33.0 | 4.4 | 17 | — |
| 53 | A | 9 | 32.7 | 1.6 | 22 | — |
| 54 | B | 9 | 32.7 | 1.6 | 2 | — |
| 55 | A | 5 | 41.2 | 3.4 | 1 | 103.9 |
| 56 | B | 5 | 41.2 | 4.2 | 0 | — |
| A | A | n/a | 0 | 1.8 | 50 | — |
| B | B | n/a | 0 | 1.4 | 100 | — |
| C* | A | n/a | No overcoat | 0 | 1 | 159.6 |

The data in Table X show that all sol-gel layers from the charge transport polymers have improved transport properties relative to those of small-molecule silane sol-gels, such as Comparative Examples A and B. Some of the films have comparable transport abilities as the Comparative Example C. The scratch depth indicates the scratch resistance of the sol-gel layers from the charge transport polymers are better than Comparative Example C. Some films show no discernable scratches, such as Examples 20, 21, 22 and 31, as compared with the 159.6 nm scratch depth of Comparative Example C.

The electrophotographic properties of various electrophotographic elements under very low humidity conditions (a relative humidity of essentially 0%) are also characterized according to the procedures described above. The electrophotographic element samples obtained according to the foregoing examples and the low intensity continuous exposure analysis equipment are placed in an environmental chamber which is then purged with pre-dried air for 24 hours. The relative humidity in the chamber under this environment is essentially zero. The photo discharge results from the analysis are then obtained following substantially the same methods mentioned above. Under the low humidity conditions, the electrophotographic elements give the following results as shown in Table XI:

TABLE XI

Electrophotographic Performance at Low RH Level

| Example | Substrate | Polymer | CTM % in sol-gel (wt %) | −Vtoe (V) (50% RH) | −Vtoe (V) (~0% RH) |
|---|---|---|---|---|---|
| 12 | A | P4 | 32.1 | 7 | 8 |
| 13 | B | P4 | 32.1 | 8 | 2 |
| 19 | A | P3 | 20.9 | 1 | 4 |
| 20 | B | P3 | 20.9 | 0 | 5 |
| 28 | A | P2 | 7.1 | 30 | 75 |
| 29 | B | P2 | 7.1 | 40 | 80 |
| 37 | A | P7 | 31.4 | 18 | 10 |
| 38 | B | P7 | 31.4 | 6 | 2 |
| 44 | B | P9 | 32.7 | 0 | 5 |
| 45 | B | P9 | 32.7 | 6 | 6 |

Comparison of the discharge data in Tables X and XI show that generally the electrophotographic elements of the invention, except for the two with low CTM concentrations (Examples 28 and 29), are not sensitive to humidity and give desirable discharge and low toe voltages at near zero humidity. The example results demonstrate that the developed new silsesquioxane polymers have excellent electrophotographic, physical and chemical properties.

The invention has been described in detail with particular reference to certain preferred embodiments thereof, but it is to be understood that variations and modifications can be effected within the spirit and scope of the invention.

We claim:

1. An electrophotographic element comprising:
an electrically conducting layer;
a charge generating layer overlying said electrically conducting layer; and
a first charge transport layer overlying said electrically conducting layer, said first charge transport layer comprising the condensed reaction product of a charge transport polymer comprising structural units having the formula:

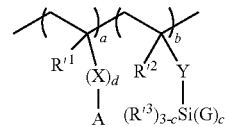

wherein:
A is a tertiary arylamine charge transport moiety;
X is a divalent bridging moiety;
Y is a divalent bridging moiety;
$R^{r1}$ and $R^{r2}$ are independently hydrogen or a $C_{1-4}$ alkyl;
G is independently a hydrolyzable group;
$R^{r3}$ is independently a $C_{1-18}$ alkyl, a $C_{1-10}$ fluoroalkyl, or a $C_{6-12}$ substituted or unsubstituted aryl;
c is an integer from 1 to 3;
d is 0 or 1;
a is a mole fraction of from about 0.01 to about 0.99;
b is a mole fraction of from about 0.99 to about 0.01; and
a+b is 1.00 or less,
with optionally at least one additional silane monomer having at least one functional group thereon;
and further comprising a second charge transport layer disposed between said charge generating layer and said first charge transport layer wherein said second charge transport layer comprises the charge transport polymer.

2. An electrophotographic element according to claim 1, wherein
said first charge transport layer comprises a silsesquioxane of the condensed reaction product of the charge transport polymer
from about 5 to 30 weight percent of basic surface charge colloidal silica based on the weight of the silsesquioxane, wherein the basic surface charge colloidal silica is stabilized with a sodium salt of silanol, and condensation is catalyzed by acetic acid, with optionally at least one additional silane monomer having at least one functional group thereon.

3. The electrophotographic element of claim 2 wherein G is selected from halogen, hydroxyl, or $C_{1-6}$ alkoxy groups.

4. The electrophotographic element of claim 2 wherein the tertiary amine charge transport moiety has an oxidation potential of from about 0.6 to about 1.2 volts versus a standard calomel electrode.

5. The electrophotographic element of claim 2 wherein d is 1.

6. The electrophotographic element of claim 5 wherein X is selected from the group consisting of an ester residue —COO— or —OCO—; oxygen; an arylene moiety having up to about 18 carbon atoms; an alkylene moiety having up to about 6 carbon atoms; and combinations thereof.

7. The electrophotographic element of claim 2 wherein Y is selected from the group consisting of an ester residue —COO— or —OCO—; oxygen; an arylene moiety having up to about 18 carbon atoms; an alkylene moiety having up to about 6 carbon atoms; and combinations thereof.

8. The electrophotographic element of claim 2 wherein a is from about 0.1 to about 0.9.

9. The electrophotographic element of claim 2 wherein a is from about 0.15 to about 0.85.

10. The electrophotographic element of claim 2 wherein a is from about 0.25 to about 0.8.

11. The electrophotographic element of claim 2 wherein c is 2.

12. The electrophotographic element of claim 2 wherein c is 3.

13. The electrophotographic element of claim 12 wherein G is methoxy.

14. The electrophotographic element of claim 2 wherein $R^{i1}$ and $R^{i2}$ are independently hydrogen or methyl.

15. The electrophotographic element of claim 2 wherein the optional at least one silane monomer is present.

16. The electrophotographic element of claim 15 wherein the at least one silane monomer is an alkyltrialkoxysilane.

17. The electrophotographic element of claim 15 wherein the at least one silane monomer is at least one alkyltrialkoxysilane corresponding to the formula:

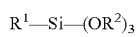

wherein
  $R^1$ is an aliphatic, cycloaliphatic, or aromatic group containing up to about 18 carbon atoms, and
  $R^2$ is an alkyl group containing 1 to about 6 carbon atoms.

18. The electrophotographic element of claim 17 wherein $R^1$ is selected from the group consisting of alkyls containing up to about 18 carbon atoms, fluoroalkyl containing up to about 18 carbon atoms, cycloalkyl containing 5 to about 12 carbon atoms, and aryl containing 6 to about 12 carbon atoms.

19. The electrophotographic element of claim 17 wherein $R^1$ is an alkyl group containing 1 to about 3 carbon atoms.

20. The electrophotographic element of claim 17 wherein $R^1$ is a methyl group.

21. The electrophotographic element of claim 15 wherein the at least one silane monomer is methyltrimethoxysilane.

22. The electrophotographic element of claim 2 wherein A is selected from the group consisting of:

CTM I

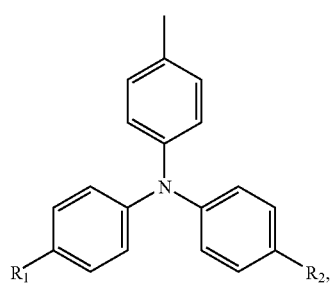

CTM II

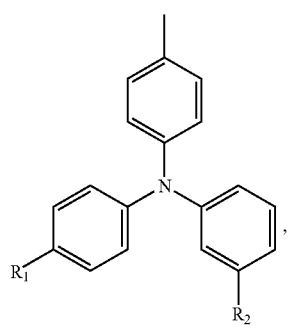

CTM III

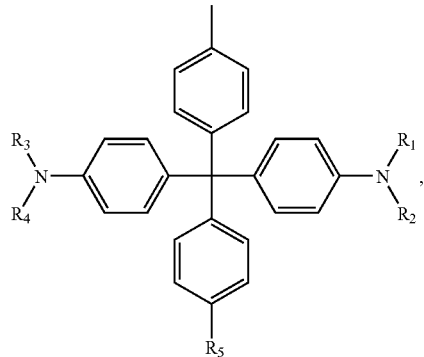

CTM IV

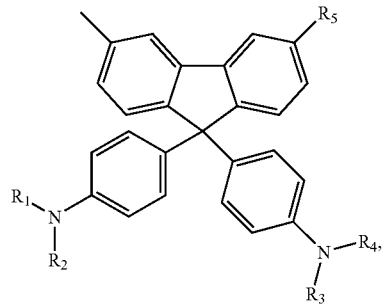

CTM V

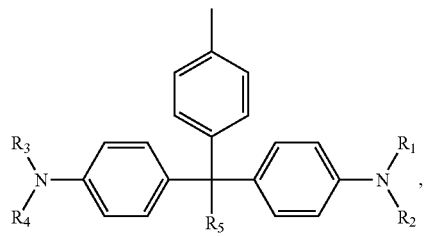

CTM VI

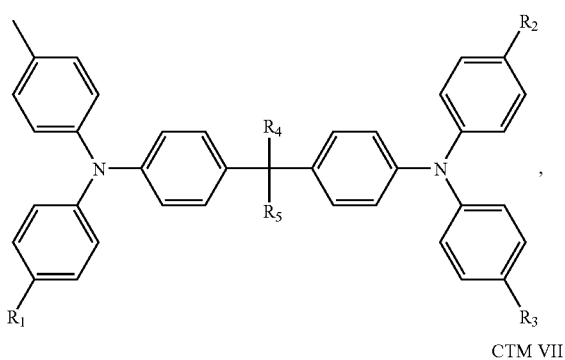

CTM VII

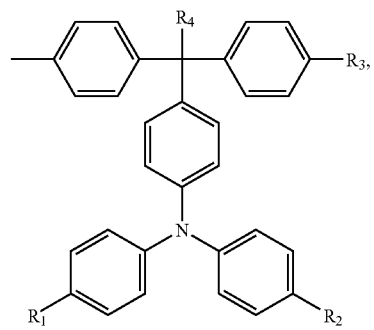

-continued
CTM VIII
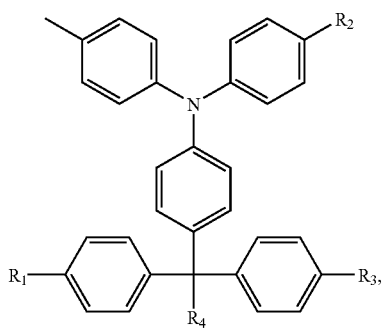
CTM IX
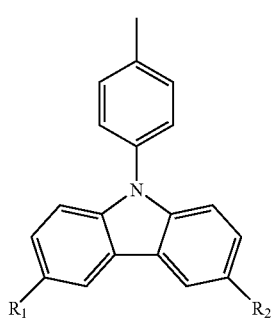
CTM X
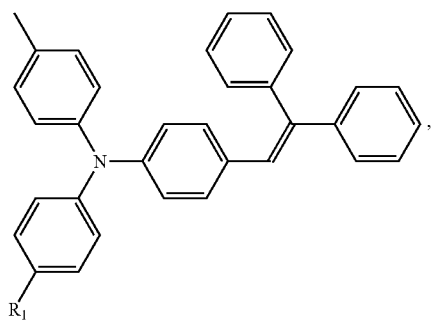
CTM XI
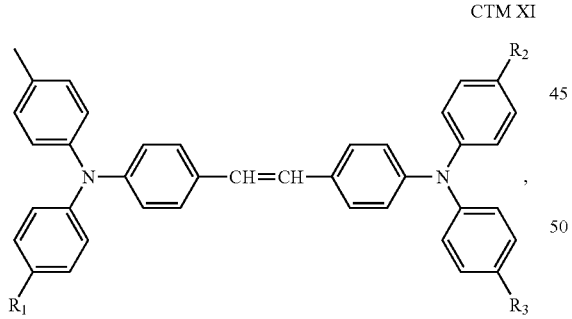
CTM XII
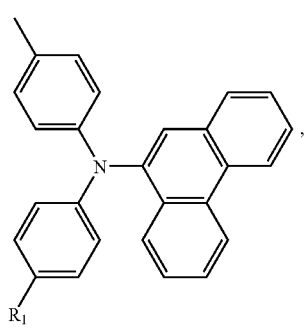
-continued
CTM XIII
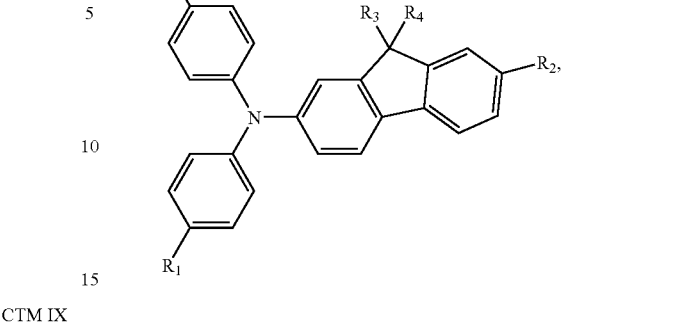
CTM XIV
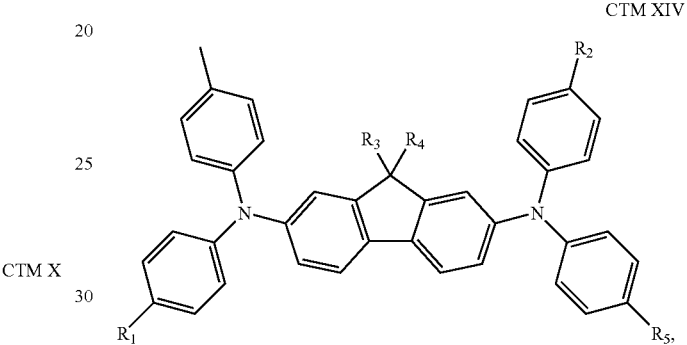
CTM XV
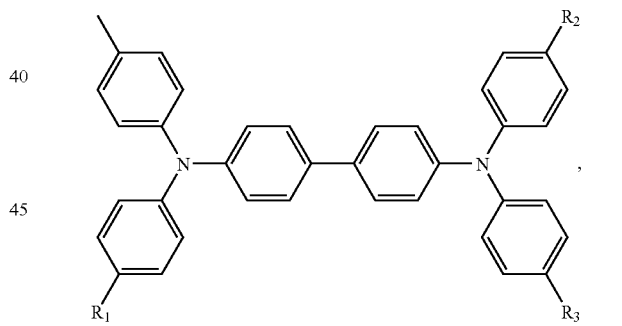
CTM XVI
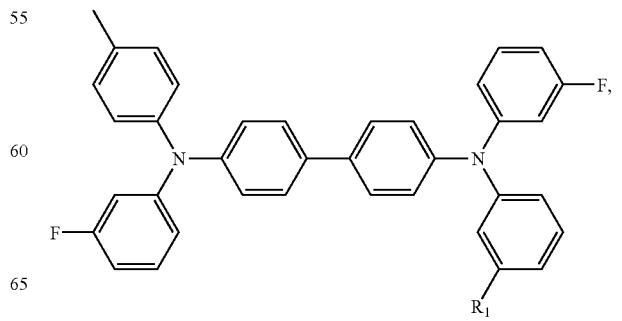

-continued

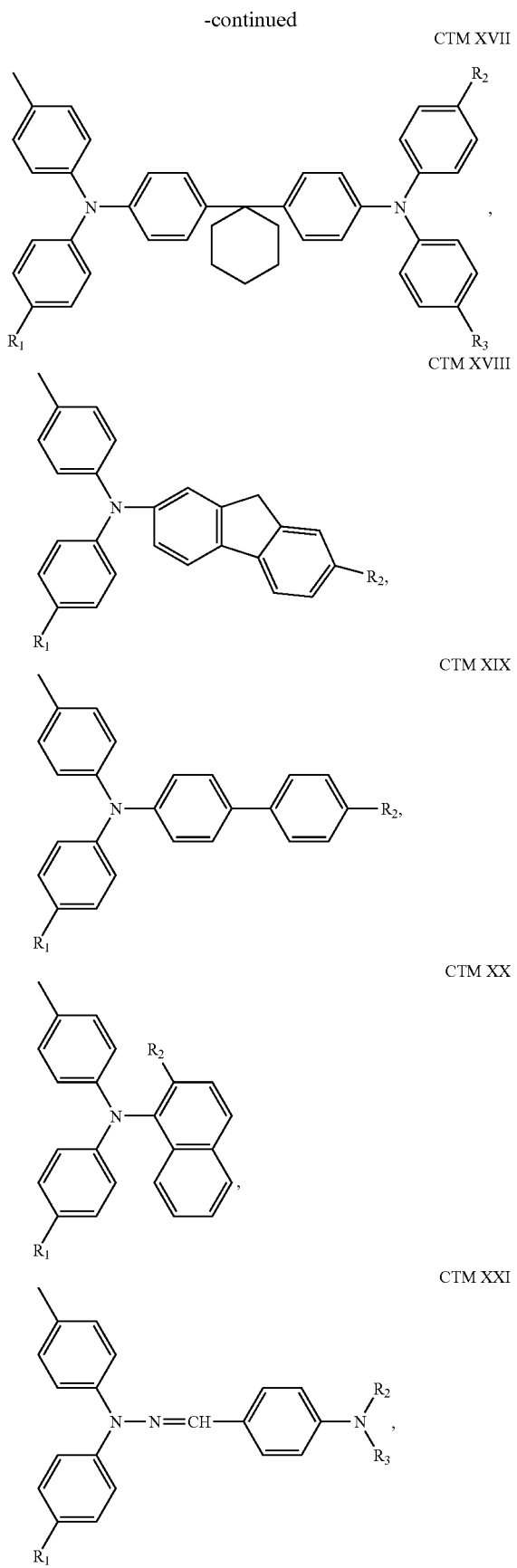

CTM XVII

CTM XVIII

CTM XIX

CTM XX

CTM XXI

-continued

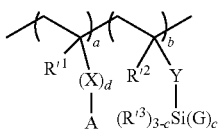

CTM XXII and mixtures thereof, wherein $R_1$, $R_2$, $R_3$, $R_4$ and $R_5$ are independently in each CTM structure selected from hydrogen, an alkyl group having 1 to about 6 carbon atoms, or an alkoxy group having 1 to about 6 carbon atoms.

23. The electrophotographic element of claim 2 wherein the first charge transport layer is an overcoat layer overlying the charge generation layer.

24. The electrophotographic element of claim 23 wherein said first charge transport layer has a thickness of about 0.5 micron to about 10 microns.

25. The electrophotographic element of claim 23 wherein said first charge transport layer has a thickness of about 1 micron to about 3 microns.

26. The electrophotographic element of claim 2 wherein the condensed reaction product is prepared in a polar solvent medium.

27. The electrophotographic element of claim 26 wherein the polar solvent medium comprises water.

28. The electrophotographic element of claim 27 wherein the polar solvent medium further comprises a water-miscible organic solvent.

29. The electrophotographic element of claim 28 wherein said water-miscible organic solvent is selected from the group consisting of methanol, ethanol, isopropyl alcohol, methyl isobutyl ketone, and mixtures thereof.

30. The electrophotographic element of claim 2 further comprising a baffler layer overlying said electrically conducting layer.

31. The electrophotographic element of claim 2 wherein the first charge transport layer has a thickness of up to about 40 microns.

32. An electrophotographic element comprising:
an electrically conducting layer;
a charge generating layer overlying said electrically conducting layer; and
a first charge transport layer overlying said electrically conducting layer, said first charge transport layer comprising the condensed reaction product of a charge transport polymer comprising structural units having the formula:

$$\left(\begin{array}{c}R'^1\\(X)_d\\A\end{array}\right)_a \left(\begin{array}{c}R'^2\\|\\(R'^3)_{3-c}Si(G)_c\end{array}\right)_b Y$$

wherein:
A is a tertiary arylamine charge transport moiety;
X is a divalent bridging moiety;
Y is a divalent bridging moiety;
$R'^1$ and $R'^2$ are independently hydrogen or a $C_{1-4}$ alkyl;
G is independently a hydrolyzable group;

$R^{t3}$ is independently a $C_{1-18}$ alkyl, a $C_{1-10}$ fluoroalkyl, or a $C_{6-12}$ substituted or unsubstituted aryl;

c is an integer from 1 to 3;

d is 0 or 1;

a is a mole fraction of from about 0.01 to about 0.99;

b is a mole fraction of from about 0.99 to about 0.01; and a+b is 1.00 or less, with optionally at least one additional silane monomer having at least one functional group thereon;

and further comprising a second charge transport layer disposed between said charge generating layer and said first charge transport layer wherein said second charge transport layer comprises the condensed reaction residue of the charge transport polymer.

33. An electrophotographic element according to claim 32, wherein said first charge transport layer comprises a silsesquioxane of the condensed reaction product of the charge transport polymer and from about 5 to 30 weight percent of basic surface charge colloidal silica based on the weight of the silsesquioxane, wherein the basic surface charge colloidal silica is stabilized with a sodium salt of silanol, and condensation is catalyzed by acetic acid, with optionally at least one additional silane monomer having at least one functional group thereon.

34. The electrophotographic element of claim 33 wherein G is selected from halogen, hydroxyl, or $C_{1-6}$ alkoxy groups.

35. The electrophotographic element of claim 33 wherein the tertiary amine charge transport moiety has an oxidation potential of from about 0.6 to about 1.2 volts versus a standard calomel electrode.

36. The electrophotographic element of claim 33 wherein d is 1.

37. The electrophotographic element of claim 33 wherein X is selected from the group consisting of an ester residue —COO— or —OC—; oxygen; an arylene moiety having up to about 18 carbon atoms; an alkylene moiety having up to about 6 carbon atoms; and combinations thereof.

38. The electrophotographic element of claim 33 wherein Y is selected from the group consisting of an ester residue —COO— or —OCO—; oxygen; an arylene moiety having up to about 18 carbon atoms; an alkylene moiety having up to about 6 carbon atoms; and combinations thereof.

39. The electrophotographic element of claim 33 wherein a is from about 0.1 to about 0.9.

40. The electrophotographic element of claim 33 wherein a is from about 0.15 to about 0.85.

41. The electrophotographic element of claim 33 wherein a is from about 0.25 to about 0.8.

42. The electrophotographic element of claim 33 wherein c is 2.

43. The electrophotographic element of claim 33 wherein c is 3.

44. The electrophotographic element of claim 43 wherein G is methoxy.

45. The electrophotographic element of claim 33 wherein $R^{t1}$ and $R^{t2}$ are independently hydrogen or methyl.

46. The electrophotographic element of claim 33 wherein the optional at least one silane monomer is present.

47. The electrophotographic element of claim 46 wherein the at least one silane monomer is an alkyltrialkoxysilane.

48. The electrophotographic element of claim 46 wherein the at least one silane monomer is at least one alkyltrialkoxysilane corresponding to the formula:

$R^1$—Si—$(OR^2)_3$ wherein $R^1$ is an aliphatic, cycloaliphatic, or aromatic group containing up to about 18 carbon atoms, and $R^2$ is an alkyl group containing 1 to about 6 carbon atoms.

49. The electrophotographic element of claim 48 wherein $R^1$ is selected from the group consisting of alkyls containing up to about 18 carbon atoms, fluoroalkyl containing up to about 18 carbon atoms, cycloalkyl containing 5 to about 12 carbon atoms, and aryl containing 6 to about 12 carbon atoms.

50. The electrophotographic element of claim 48 wherein $R^1$ is an alkyl group containing 1 to about 3 carbon atoms.

51. The electrophotographic element of claim 48 wherein $R^1$ is a methyl group.

52. The electrophotographic element of claim 46 wherein the at least one silane monomer is methyltrimethoxysilane.

53. The electrophotographic element of claim 33 wherein A is selected from the group consisting of:

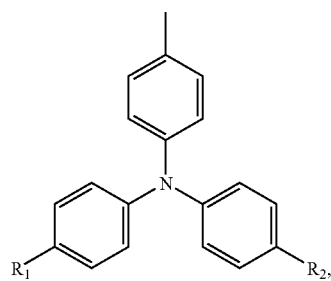

CTM I

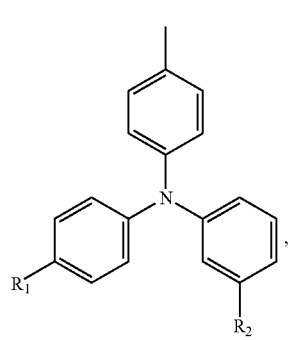

CTM II

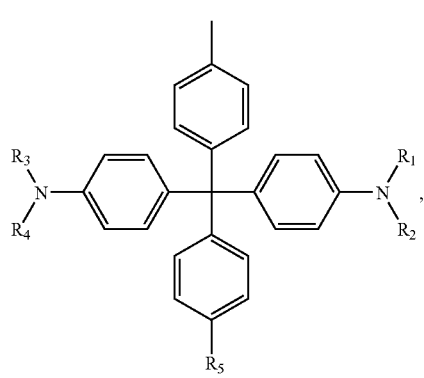

CTM III

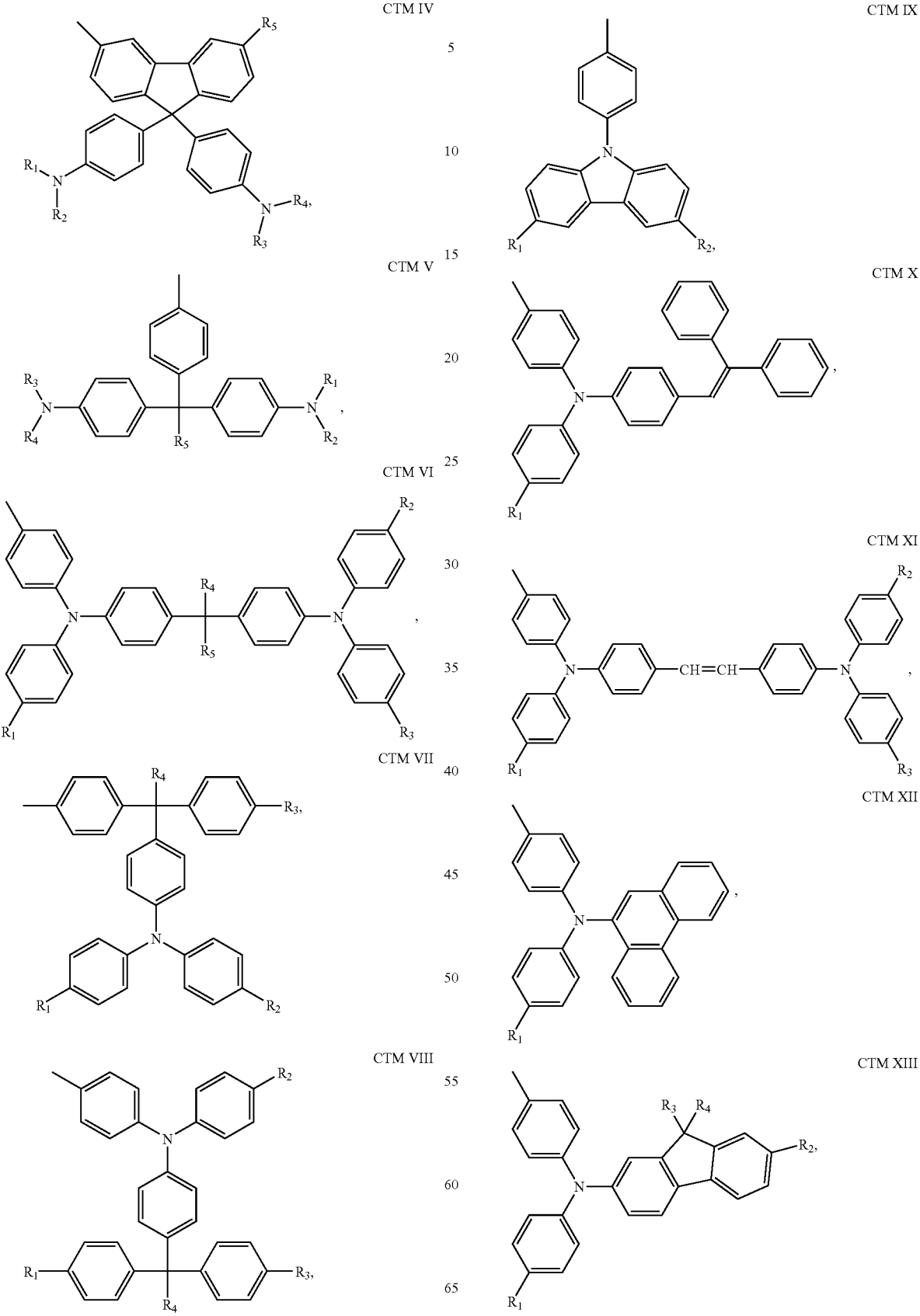

-continued
CTM XIV
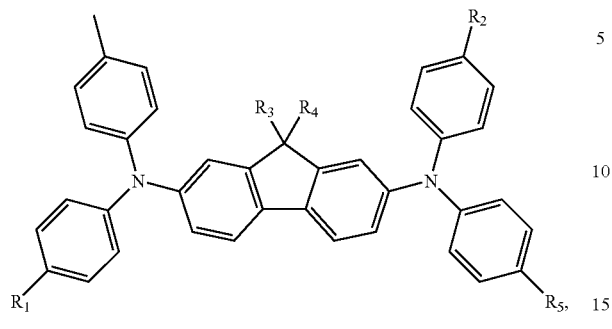
CTM XV
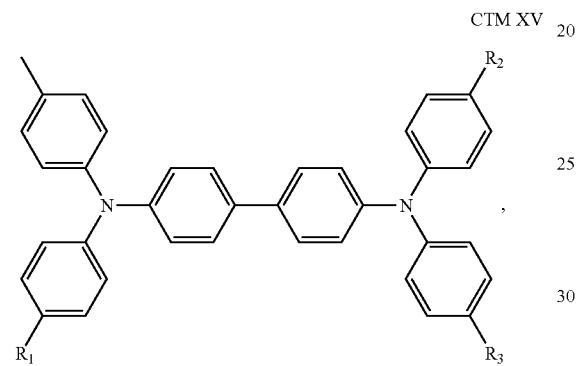
CTM XVI
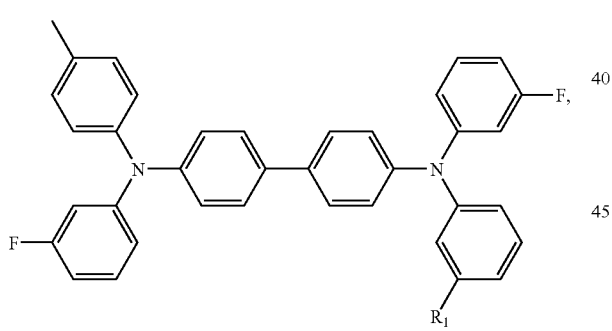
CTM XVII
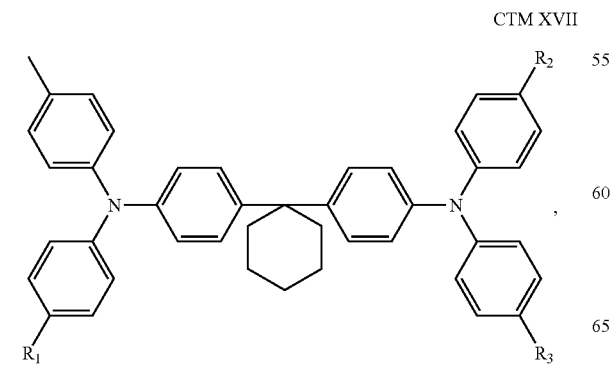
CTM XVIII
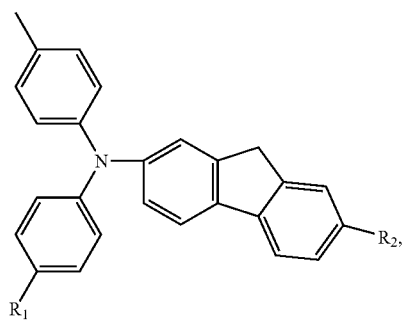
CTM XIX
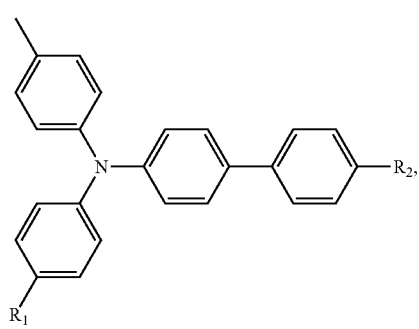
CTM XX
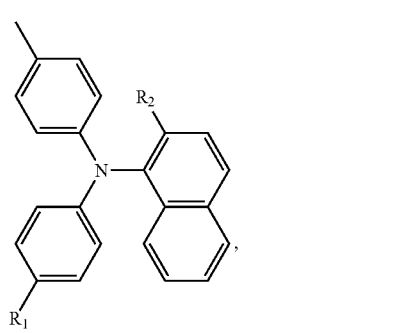
CTM XXI
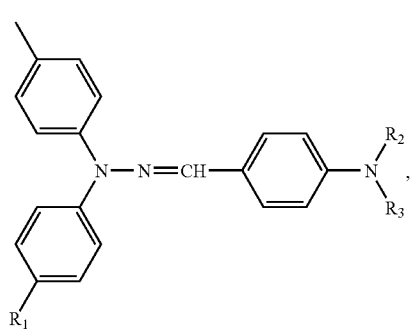
CTM XXII
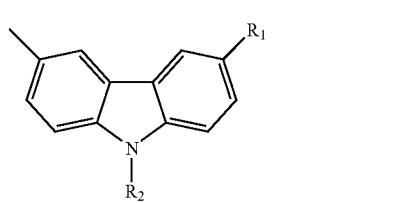
and mixtures thereof, wherein $R_1$, $R_2$, $R_3$, $R_4$ and $R_5$ are independently in each CTM structure selected from hydrogen, an alkyl group having 1 to about 6 carbon atoms, or an alkoxy group having 1 to about 6 carbon atoms.

54. The electrophotographic element of claim 33 wherein the first charge transport layer is an overcoat layer overlying the charge generation layer.

55. The electrophotographic element of claim 54 wherein said first charge transport layer has a thickness of about 0.5 micron to about 10 microns.

56. The electrophotographic element of claim 54 wherein said first charge transport layer has a thickness of about 1 micron to about 3 microns.

57. The electrophotographic element of claim 33 wherein the condensed reaction product is prepared in a polar solvent medium.

58. The electrophotographic element of claim 57 wherein the polar solvent medium comprises water.

59. The electrophotographic element of claim 58 wherein the polar solvent medium further comprises a water-miscible organic solvent.

60. The electrophotographic element of claim 59 wherein said water-miscible organic solvent is selected from the group consisting of methanol, ethanol, isopropyl alcohol, methyl isobutyl ketone, and mixtures thereof.

61. The electrophotographic element of claim 33 further comprising a barrier layer overlying said electrically conducting layer.

62. The electrophotographic element of claim 33 wherein the first charge transport layer has a thickness of up to about 40 microns.

* * * * *